United States Patent [19]
Sakata et al.

[11] Patent Number: 5,470,943
[45] Date of Patent: Nov. 28, 1995

[54] POLYIMIDE

[75] Inventors: Yoshihiro Sakata; Wataru Yamashita; Yuichi Okawa; Shoji Tamai; Tsutomu Ishida; Mitsunori Matsuo, all of Kanagawa; Keizaburo Yamaguchi, Chiba; Akihiro Yamaguchi, Kanagawa, all of Japan

[73] Assignee: Mitsui Toatsu Chemicals, Inc., Tokyo, Japan

[21] Appl. No.: 360,584

[22] Filed: Dec. 21, 1994

[30] Foreign Application Priority Data

Jan. 7, 1994 [JP] Japan ..................... 6-000398
Mar. 2, 1994 [JP] Japan ..................... 6-032095

[51] Int. Cl.$^6$ .................. C08G 77/10; C08G 69/26; C07D 213/69
[52] U.S. Cl. .......... 528/353; 528/170; 528/171; 528/172; 528/173; 528/174; 528/188; 528/183; 528/220; 528/224; 528/229; 528/324; 528/367; 546/296
[58] Field of Search .................. 528/353, 183, 528/188, 220, 229, 170–174, 367, 324, 224; 546/296

[56] References Cited

U.S. PATENT DOCUMENTS 5,089,593  2/1992  Fjare et al. ..................... 528/188

FOREIGN PATENT DOCUMENTS

| 0299865 | 1/1989 | European Pat. Off. . |
| 3490169 | 7/1989 | Germany . |
| 63-170420 | 7/1988 | Japan . |
| 1-182324 | 7/1989 | Japan . |
| 1-190652 | 7/1989 | Japan . |
| 2-60933 | 3/1990 | Japan . |
| 2-281037 | 11/1990 | Japan . |
| 4-122729 | 4/1992 | Japan . |

*Primary Examiner*—Shelley A. Dodson
*Attorney, Agent, or Firm*—Burns, Doane, Swecker & Mathis

[57] ABSTRACT

This invention relates to a novel fluorine-containing polyimide or polyimide copolymer being colorless and having transparency and very low dielectric characteristics, and has a novel aromatic diamino compound used for the polyimide, a preparation process thereof, a polyimide-based resin composition comprising the polyimide or polyimide copolymer and a fibrous reinforcement, a process for preparing the resin composition, an injection molded article of the resin composition.

The polyimide comprise a requisite structural unit having one or more recurring structural units of the formula:

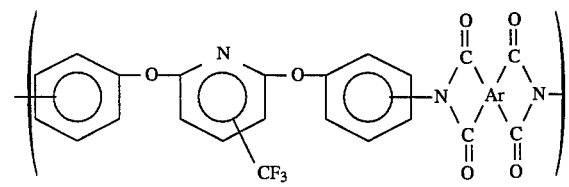

(1)

wherein Ar is a tetravalent radical having 6 to 27 carbon atoms and being selected from the group consisting of a monoaromatic radical, condensed polyaromatic radical and noncondensed polyaromatic radical having aromatic radicals connected to each other with a direct bond or a bridge member, a trifluoromethyl radical is situated at the 3- or the 4-position on a pyridine nucleus, and an imide nitrogen atom is connected at the 3- or the 4-position to an ether bond.

The polyimide or polyimide copolymer has excellent heat resistance, outstanding melt-flow stability and greatly improved processability, and also is colorless and has high transparency and very low dielectric coefficient, and can be expected to be used as raw materials for electric•electronic appliances and optical instruments due to the above characteristics.

18 Claims, 2 Drawing Sheets

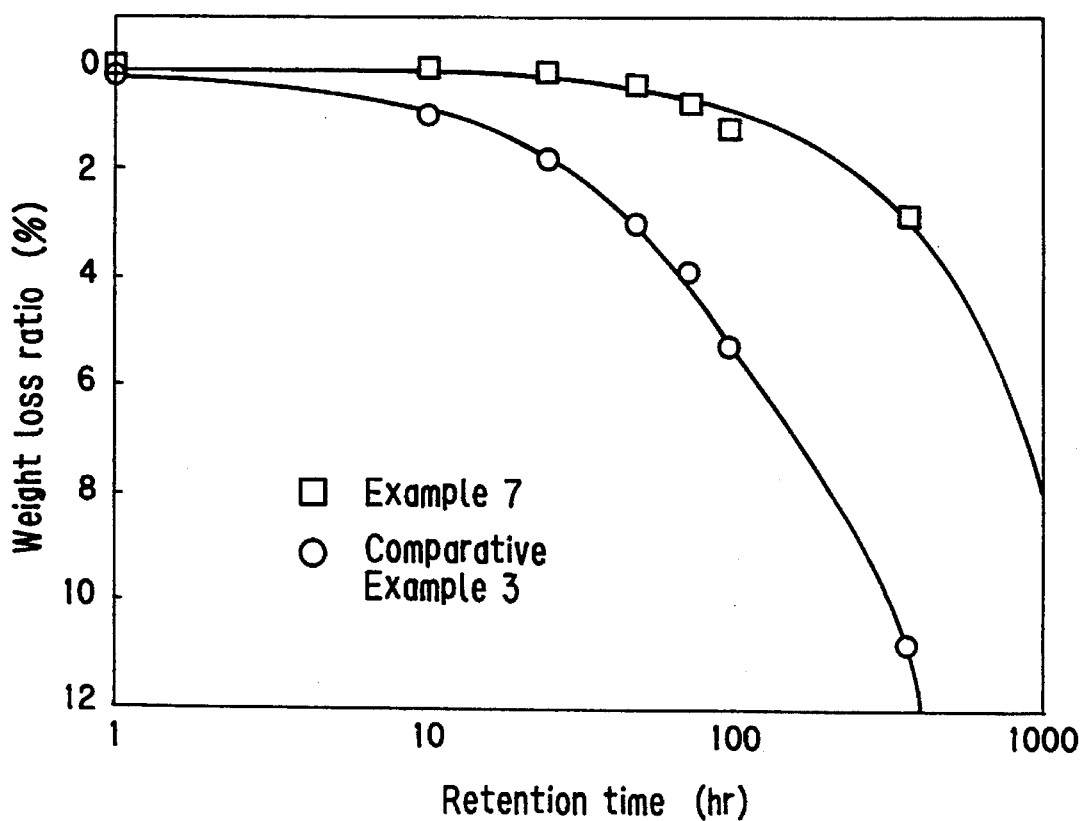

POLYIMIDE

BACKGROUND OF THE INVENTION

1. Field of the Invention

The present invention relates to a novel fluorine-containing polyimide and more particularly relates to a thermoplastic polyimide which comprises fluorine, is colorless and has high transparency and very low dielectric characteristics, and a preparation process of the same and a novel aromatic diamino compound which can be used for preparing the thermoplastic polyimide.

The novel aromatic diamino compound of the invention is useful as a raw material of polyimide of the invention and can also be applied to a raw material of other kinds of polyimide, polyamide, polyamideimide, bismaleimide and epoxy resin.

2. Related Art of the Invention

Polyimide resins obtained by reaction of tetracarboxylic dianhydride and diamine have mechanical strength, dimensional stability, flame retardance and electrical insulation properties in addition to high heat resistance, and thus have been conventionally used for raw materials or heat resistant adhesives in the field of electric and electronic appliances, space and aeronautic equipment and transportation machinery.

For example, as a product of the polyimide resins, polyimide films are expected to be widely used due to their excellent properties in the field where heat resistance is required.

In recent years, polyimide resins having a higher level of heat resistance and adhesive strength have been developed in order to use under more harsh conditions. Many kinds of polyimide which have been conventionally developed exhibit excellent properties. However, conventional polyimide is generally poor in light transmittance and has a strong tendency to color dark yellow or brown. The transmittance is particularly low in the visible region and the color has a defect of becoming deeper in the outer space. On the other hand, as to resins which are colorless and transparent or almost colorless and transparent in hue, a polyester film, polycarbonate film and aliphatic polyimide film have been developed. These films, however, are inferior in heat resistance and weatherability over a long period.

However, in the field of space development of recent years, a film having low absorption to cosmic rays has been demanded as a cover lay of a solar cell and thus development of a resin which has heat resistance and is colorless and transparent is strongly desired. Additionally, coloration is a very serious problem in the development of optical instruments such as cables and filters in an optical-fiber telecommunication system and liquid crystal display boards which require high heat resistance and high reliability.

Transparence of marketed polyimide is practically indicated, as a parameter, by an yellowness index (hereinafter referred to simply as YI) which is an indicator of yellow hue. Any marketed polyimide has very high YI. For example, Kapton (Trade Mark) prepared from 4,4'-diaminodiphenyl ether and pyromellitic dianhydride has YI of 129, polyimide Upilex-S (Trade Mark) prepared from p-phenylenediamine and biphenyltetracarboxylic dianhydride has YI of 125, and polyimide LARC-TPI (Trade Mark) prepared from 3,3'-diaminobenzophenone and benzophenonetetracarboxylic dianhydride has YI of 50.

In order to use for various optical instruments above, YI must be 10 or less. Polyimide resin comparable in quality to polycarbonate which is at present widely used for optical instruments has desirably YI of 7 or less.

As colorless and transparent polyimide, Japanese Laid-Open Patent SHO 63-170420 has already disclosed a polyimide homopolymer having recurring structural units represented by the general formula (A):

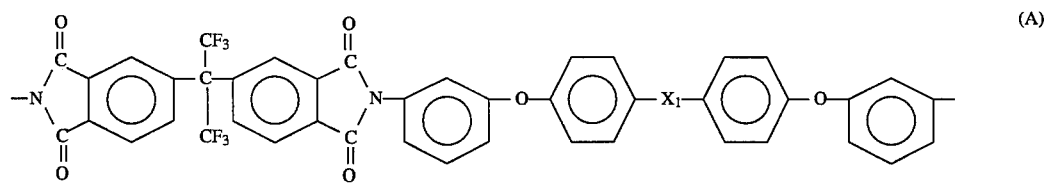

(A)

or a polyimide copolymer having recurring structural units represented by the general formula (A) and those represented by the general formula (B):

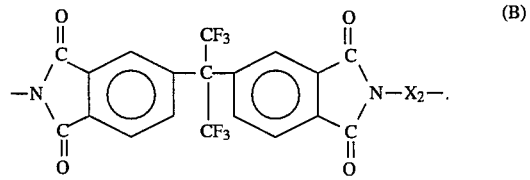

(B)

Such polyimide has very excellent transparence. However, essential heat resistance of polyimide is insufficient.

On the other hand, microelectronics has remarkably developed in recent years in the electric and electronic field. High speed transmission of signals becomes inevitable in a large-size computer in particular as a result of employing a multi-layer circuit substrate. However, a high dielectric constant of the substrate material leads to delay transmission of signals and causes problems on speeding-up the responses. Polyimide is used for an interlayer insulation membrane in a multi-layer wiring structure. Particularly the need for decreased dielectric constant has been closed up in addition to the above characteristics of conventional polyimide.

Teflon is a conventionally known fluorine-containing resin and has been known for a long time to have a low dielectric constant. Further, the fact that the dielectric constant of the polyimide resin can be lowered by introducing a fluorine atom or fluoro radical into the polyimide structure, has been reported, for example, in A. K. St. Clair et al., Polymeric Materials Science and Engineering, 59, 28–32 (1988), and EP 029986.

However, presently marketed polyimide resins have a dielectric constant of 3.5/1 MHz in Kapton, 3.5/1 MHz in Upilex-S, and 3.7/1 MHz in LARC-TPI. Conventional polyimide containing a large amount of fluorine is difficult to manufacture in industry because a polymer of sufficiently high molecular weight cannot be obtained or production cost is very high as described, for example, in Japanese Laid- Open Patent HEI 1-182324, 2-60933, 2-281037 and 4-122729. Consequently, it has been strongly desired to develop polyimide resin having a high molecular weight and a price as low as possible.

Any problem above results from electron transfer in the resin. Cutting of a conjugated system in the main chain of a polymer can improve the coloration and restriction of electron transfer in the main chain of the polymer can decrease the dielectric constant. In practice, it has been known that introduction of an electron-attractive fluorine atom into molecular units of polyimide is effective for solving these problems. For example, aromatic diamine compounds comprising a hexafluoroisopropylidene radical have been disclosed as a monomer of polyimide for low dielectric material in Japanese Laid-Open Patent HEI 1-190652. These aromatic diamine compounds, however, have problems in industry and in physical properties. For example, these compounds must be prepared by multi step synthesis or polyimide resin derived from these compounds is lacking in melt flowability for processing the resin.

As to diamine having a trifluoromethyl radical in the molecule, for example, 4,4'-bis(4-amino-5-trifluoromethylphenyloxy)biphenyl of the formula (C):

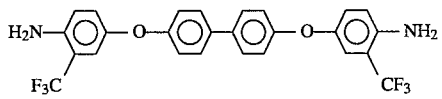

has been disclosed in DE 3,490,169.

However, the electron attractive trifluoromethyl radical of the compound is on a terminal aromatic ring where an amino radical is present and locates at an ortho-position to the amino radical.

Consequently, it has been known that the compound is difficult to react with acid anhydride due to an electronic factor and a high molecular weight polymer is difficult to obtain. Additionally, the amino radical is situated at the para position to an ether bond, and thus resultant polyimide has a rigid structure and also has a defect of difficulty on processing. Improvement of adhesion is also desired.

SUMMARY OF THE INVENTION

One object of the invention is to provide a melt-processable and thermoplastic polyimide which is colorless and transparent and has physical properties such as low dielectric characteristics in addition to essentially excellent heat resistance of polyimide.

Another object of the invention is to provide a novel aromatic diamino compound useful as a raw material of polyimide which has low dielectric and is colorless, transparent and excellent in processability and adhesion.

As a result of an intensive investigation in order to accomplish the above objects, the present inventors have found that polyimide obtained by using 2,6-bis(3- or 4-aminophenoxy)-3- or 4-trifluoromethylpyridine as a diamine monomer can achieve the above objects. Thus, the present invention has been completed.

That is, one aspect of the invention is as follows.

(1) A polyimide comprising a requisite structural unit consisting of one or more recurring structural units represented by the formula (1):

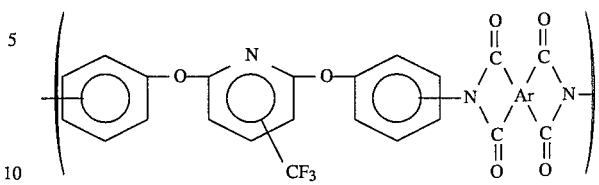

wherein Ar is a tetravalent radical having 6 to 27 carbon atoms and being selected from the group consisting of a monoaromatic radical, condensed polyaromatic radical and noncondensed polyaromatic radical having aromatic radicals connected to each other with a direct bond or a bridge member, a trifluoromethyl radical is situated at the 3- or the 4-position on a pyridine nucleus, and an imide nitrogen atom is connected at the 3- or the 4-position to an ether bond.

(2) A polyimide comprising a requisite structural unit consisting of one or more recurring structural units represented by the formula (1):

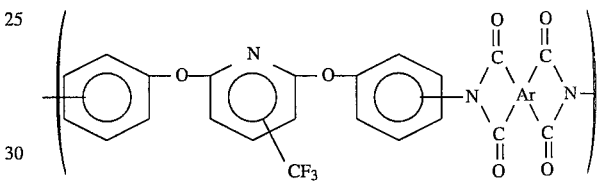

wherein Ar and positions of the trifluoromethyl radical and the imide nitrogen atom are the same as above, and having at the polymer chain end thereof an aromatic ring which is essentially unsubstituted or substituted with a radical having no reactivity with amine or dicarboxylic anhydride.

(3) The polyimide of the above (1) or (2) comprising a requisite structural unit of one or more recurring structural units represented by the formula (1-1):

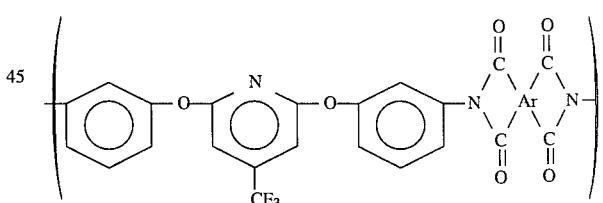

wherein Ar is the same as in the formula (1).

(4) The polyimide of the above (1) or (2) comprising a requisite structural unit of one or more recurring structural units represented by the formula (1-2):

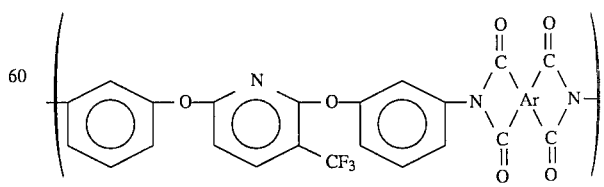

wherein Ar is the same as in the formula (1).

(5) A polyimide or a polyimide copolymer comprising a requisite structural unit consisting of 1~100 mol% of recurring structural units represented by the formula (1):

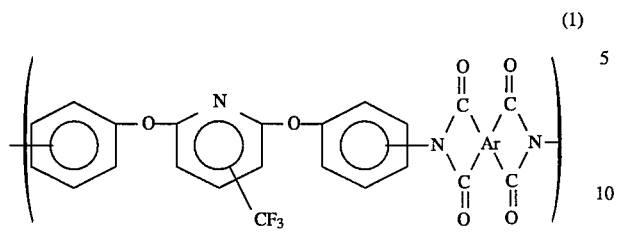

wherein Ar and positions of the trifluoromethyl radical and the imide nitrogen atom are the same as above, and 99~0 mol% of recurring structural units represented by the formula (2):

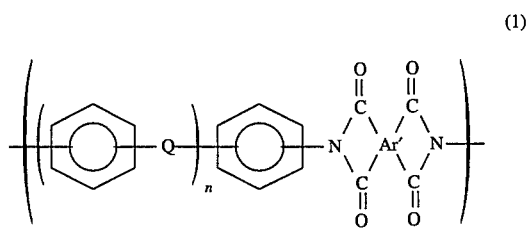

wherein n is an integer of 0 to 6; Q is a direct fond, —O—, —S—, —CO—, —SO$_2$—, —CH$_2$—, —C(CH$_3$)$_2$— or —C(CF$_3$)$_2$—, and when two or more bonding radicals Q connect aromatic rings to each other, the bonding radicals Q can be the same or different; and Ar' is a tetravalent radical having 6 to 27 carbon atoms and being selected from the group consisting of a monoaromatic radical, condensed polyaromatic radical and noncondensed polyaromatic radical having aromatic radicals connected to each other with a direct bond or a bridge member; or polyimide or a polyimide copolymer having at the polymer chain end a radical which is essentially unsubstituted or substituted with a radical having no reactivity with amine or dicarboxylic anhydride.

(6) A preparation process of a polyimide having a requisite structural unit consisting of one or more recurring structural units represented by the formula (1):

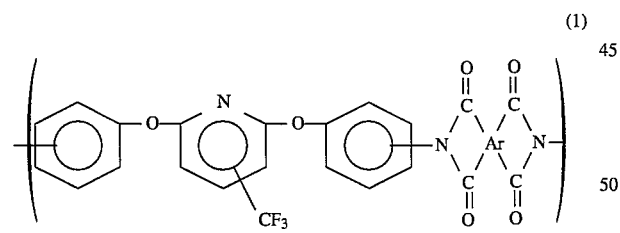

wherein Ar and positions of the trifluoromethyl radical and the imide nitrogen atom are the same as above, comprising reacting aromatic diamine consisting essentially of one or more aromatic diamino compounds represented by the formula (3):

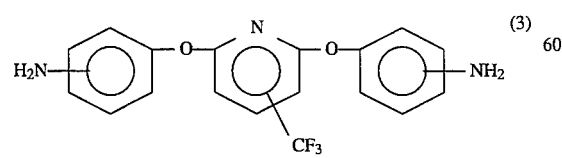

wherein a trifluoromethyl radical is situated at the 3- or the 4-position on a pyridine nucleus, and an amino radical is substituted at the 3- or the 4-position to an ether bond, with tetracarboxylic dianhydride essentially represented by the formula (4):

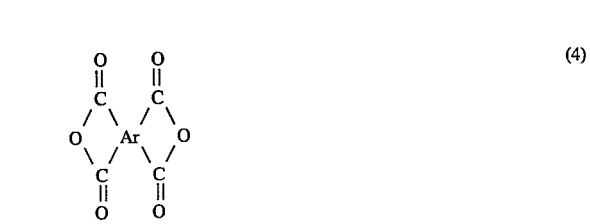

wherein Ar is a tetravalent radical having 6 to 27 carbon atoms and being selected from the group consisting of a monoaromatic radical, condensed polyaromatic radical and noncondensed polyaromatic radical having aromatic radicals connected to each other with a direct bond or a bridge member; and thermally or chemically imidizing the resulting polyamic acid.

(7) A preparation process of a polyimide having a requisite structural unit consisting of one or more recurring structural units represented by the formula (1) :

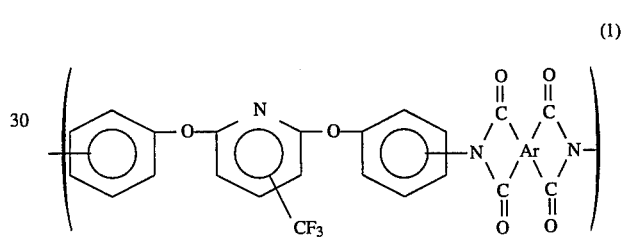

wherein Ar and positions of the trifluoromethyl radical and the imide nitrogen atom are the same as above, and having at the polymer chain end thereof an aromatic ring which is essentially unsubstituted or substituted with a radical having no reactivity with amine or dicarboxylic anhydride, comprising reacting aromatic diamine consisting essentially of one or more aromatic diamino compounds represented by the formula (3):

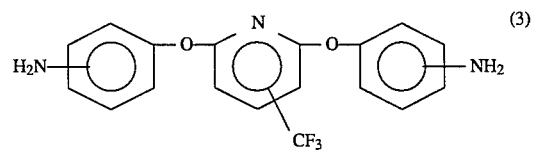

wherein positions of the trifluoromethyl radical and the amino radical are the same as above, with tetracarboxylic dianhydride essentially represented by the formula (4):

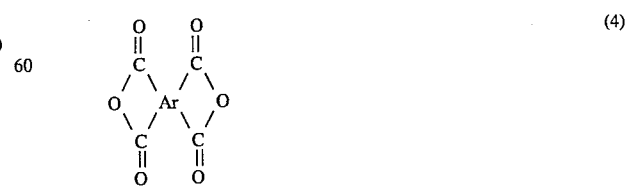

wherein Ar is the same as above, in the presence of aromatic dicarboxylic anhydride represented by the formula (5):

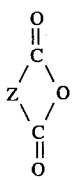 (5)

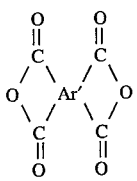 (10)

wherein Z is a divalent radical having 6 to 15 carbon atoms and being selected from the group consisting of a monoaromatic radical, condensed polyaromatic radical and noncondensed polyaromatic radical having aromatic radicals connected to each other with a direct bond or bridge member, or aromatic monoamine represented by the formula (6):

$Z_1$—$NH_2$ (6)

wherein $Z_1$ is a monovalent radical having 6 to 15 carbon atoms and being selected from the group consisting of a monoaromatic radical, condensed polyaromatic radical and noncondensed polyaromatic radical having aromatic radicals connected to each other with a direct bond or a bridge member; and thermally or chemically imidizing the resulting polyamic acid.

(8) A preparation process of polyimide or a polyimide copolymer of the above (5), comprising reacting 1~0.01 parts by mole of aromatic diamine represented by the formula (3):

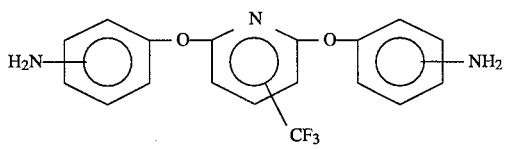 (3)

wherein positions of the trifluoromethyl radical and the amino radical are the same as above, with 1~0.01 parts by mole of tetracarboxylic dianhydride essentially represented by the formula (4):

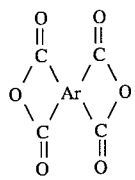 (4)

wherein Ar is the same as above, and further reacting 0~0.99 parts by mole of one or more aromatic diamines represented by the formula (9):

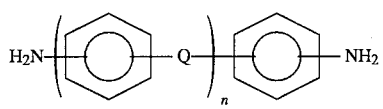 (9)

wherein n is an integer of 0~6, and Q is a direct bond, —O—, —S—, —CO—, —$SO_2$—, —$CH_2$—, —$C(CH_3)_2$— or —$C(CH_3)_2$—, and when two or more bonding radicals Q connect aromatic rings to each other, the bonding radicals Q can be the same or different, with 0~0.99 parts by mole of tetracarboxylic dianhydride represented by the formula (10):

wherein Ar' is a tetravalent radical having 6 to 27 carbon atoms and being selected from the group consisting of a monoaromatic radical, condensed polyaromatic radical and noncondensed polyaromatic radical having aromatic radicals connected to each other with a direct bond or a bridge member.

(9) A preparation process of polyimide or a polyimide copolymer of the above (8), comprising carrying out the above reaction in the presence of 0.001~1.0 mol of aromatic dicarboxylic anhydride represented by the formula (5):

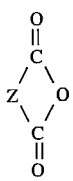 (5)

wherein Z is the same as above, for 1 mol of total aromatic diamine, or in the presence of 0.001~1.0 mol of aromatic monoamine represented by the formula (6)

$Z_1$—$NH_2$ (6)

wherein $Z_1$ is the same as above, for 1 mol of total tetracarboxylic dianhydride; and thermally or chemically imidizing the resulting polyamic acid.

Further aspects of the invention relate as follows to novel aromatic compounds which can be used as a monomer of polyimide in the invention.

(10) An aromatic diamino compound represented by the formula (3) :

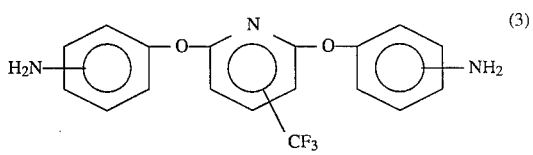 (3)

wherein positions of the trifluoromethyl radical and the amino radical are the same as above.

Following diamino compounds are preferred in particular.

(11) An aromatic diamino compound represented by the formula (3-1):

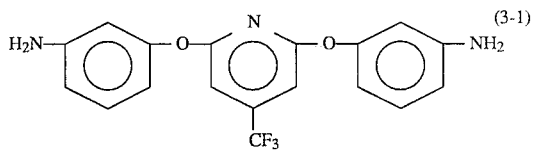 (3-1)

(12) An aromatic diamino compound represented by the formula (3-2):

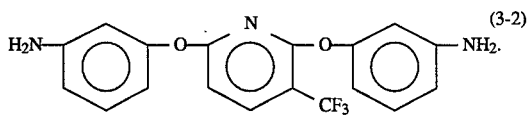

(13) A preparation process of the aromatic diamino compound represented by the above formula (3) comprising carrying out condensation of 2,6-dichloro-3- or 4-trifluoromethylpyridine with 3- or 4-aminophenol in an aprotic polar solvent in the presence of a base.

Still further aspects of the invention relate to polyimide based resin compositions and polyimide articles.

(14) A polyimide based resin composition comprising 100 parts by weight of polyimide or a polyimide copolymer of the above (5) and 5 to 70 parts by weight of a fibrous reinforcement selected from carbon fiber, glass fiber, aromatic polyamide fiber and potassium titanate fiber.

(15) An injection molded article obtained from the polyimide based resin composition.

(16) A polyimide film comprising polyimide or the polyimide copolymer of the invention.

Polyimide or the polyimide copolymer of the present invention is obtained by using 2,6-bis(3- or 4-aminophenoxy)-3- or 4-trifluoromethylpyridine as aromatic diamine component, and is outstanding in melt-flow stability and has excellent heat resistance and greatly improved processability, and also is colorless and has high transparency and very low dielectric coefficient. Consequently, the polyimides can be expected to be used as raw materials for electric electronic appliances and optical instruments.

BRIEF DESCRIPTION OF THE DRAWINGS

FIG. 2 is results measured on weight loss ratio in air at 350° C. of the polyimide powder obtained in Example 7 and Comparative Example 3.

DETAILED DESCRIPTION OF THE INVENTION

Figure 1:
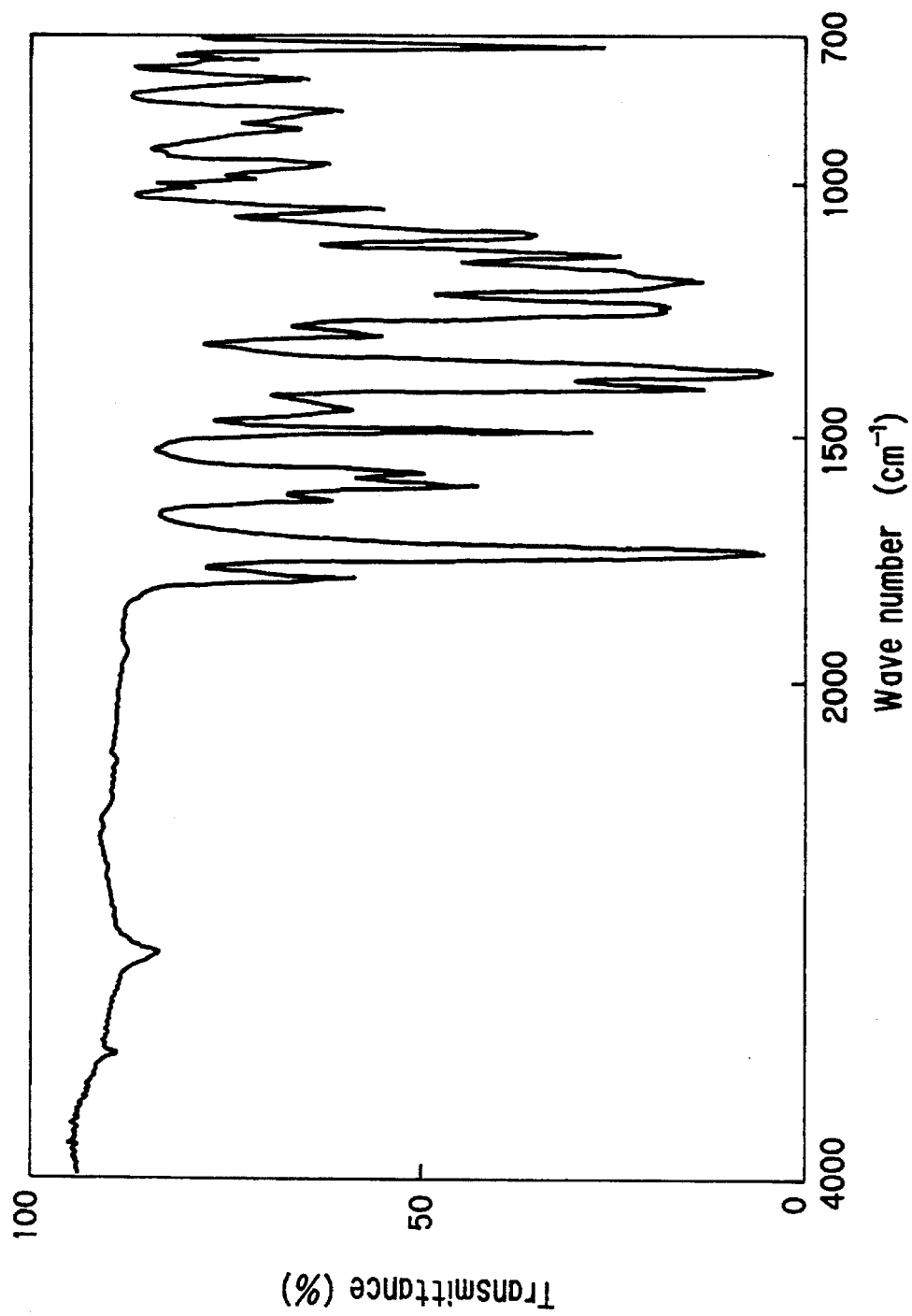
FIG. 1 is an infrared absorption spectrum atlas of the polyimide powder obtained in Example 3.

Polyimide of the invention comprises a requisite structural unit consisting of one or more recurring structural units represented by the formula (1):

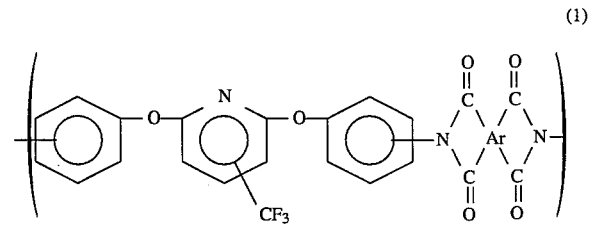

wherein Ar and positions of the trifluoromethyl radical and the imide nitrogen atom are the same as above.

Particularly preferred polyimide comprises a requisite structural unit consisting of recurring structural units represented by the formula (1-1):

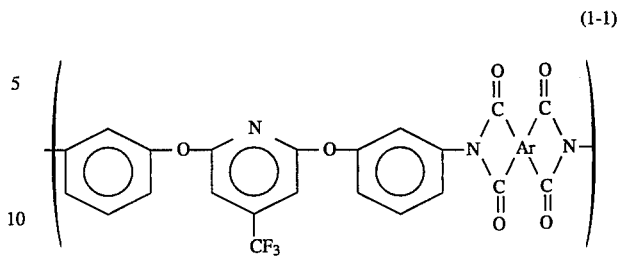

wherein Ar is the same as above, and/or one or more recurring structural units represented by the formula (1-2):

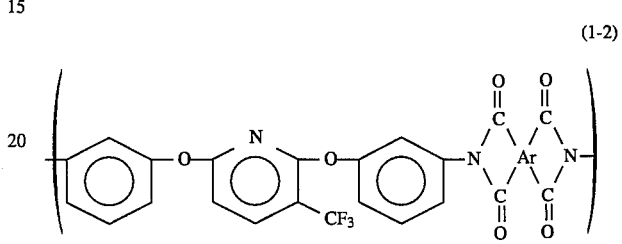

wherein Ar is the same as above.

Further, polyimide or a polyimide copolymer of the invention comprises a requisite structural unit consisting of 1~100 mol % of recurring structural units represented by the above formula (1) and 99~0 mol % of recurring structural units represented by the formula (2):

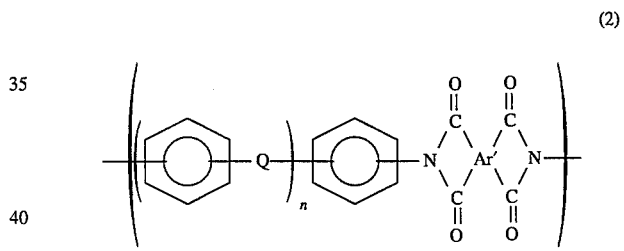

wherein n, Q and Ar' are the same as above. The polyimide copolymer comprises the recurring structural units represented by the formula (1) in a proportion of preferably 50 mol % or more, more preferably 70 mol % or more.

Polyimide or the polyimide copolymer can also have at the polymer chain end an aromatic ring which is essentially unsubstituted or substituted with a radical having no reactivity with amine or dicarboxylic anhydride.

Polyimide having recurring structural units represented by the above formula (1) can be prepared by reacting aromatic diamine essentially consisting of one or more aromatic diamino compounds represented by the formula (3):

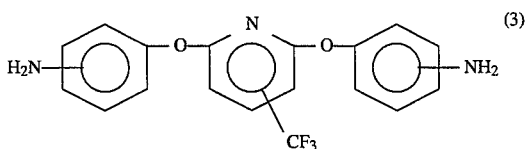

wherein a trifluoromethyl radical is situated at the 3- or the 4-position on a pyridine nucleus, and an amino radical is substituted at the 3- or the 4-position to an ether bond, with tetracarboxylic dianhydride essentially represented by the formula (4):

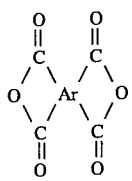

(4)

wherein Ar is a tetravalent radical having 6 to 27 carbon atoms and being selected from the group consisting of a monoaromatic radical, condensed polyaromatic radical and noncondensed polyaromatic radical having aromatic radicals connected to each other with a direct bond or a bridge member, and thermally or chemically imidizing the resulting polyamic acid.

The aromatic diamino compound used for preparing polyimide of the invention is aromatic diamine represented by the formula (3):

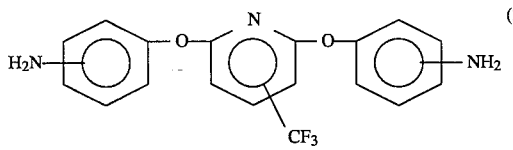

(3)

wherein positions of the trifluoromethyl radical and the amino radical are the same as above. A preferred aromatic diamino compound has the formula (3-1):

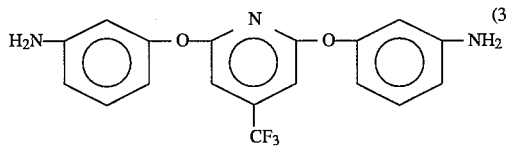

(3-1)

or is represented by the formula (3-2):

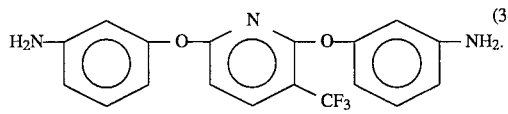

(3-2)

The aromatic diamino compound of the invention is the fluorine containing diamine compound having pyridine nucleus with trifluoromethyl radical in the molecular, and additionally having the amino radical at the meta position to the ether bond.

The preparation process of the above aromatic diamino compound will hereinafter be illustrated in detail.

2,6-Bis(3- or 4-aminophenoxy)-3- or 4-trifluoromethylpyridine of the invention can be prepared by reaction of 2,6-dichloro-3-trifluoromethylpyridine or 2,6-dichloro-4-trifluoromethylpyridine and 3- or 4-aminophenol in an aprotic polar solvent in the presence of a base.

In the process of the invention, 2 equivalents or more of 3- or 4-aminophenol is sufficient for the amount of 2,6-dichloro-3-trifluoromethylpyridine or 2,6-dichloro-4-trifluoromethylpyridine.

Preferred range of use is 2~2.5 equivalents in consideration of complex post treatment and cost increase.

The base which can be used in the invention is carbonate, hydrogen carbonate, hydroxide or alkoxide of alkali metals.

Exemplary bases include potassium carbonate, potassium hydrogen carbonate, potassium hydroxide, sodium carbonate, sodium hydroxide, sodium hydrogen carbonate, lithium carbonate, lithium hydroxide, sodium methoxide and potassium isopropoxide. The amount of these bases used is 1 equivalent or more, preferably 1~2 equivalents for the hydroxyl group in the raw material 3- or 4-aminophenol.

Representative solvents which can be used in the process of the invention include formamide, N-methylformamide, N,N-dimethylformamide, N,N-diethylformamide, N,N-dimethylacetamide, N-methylpyrrolidone, 1,3-dimethyl-2-imidazolidinone, dimethyl sulfoxide and sulfolane. No particular limitation is imposed upon the amount of these solvents. Usually, 1~10 times by weight of the solvent is sufficient for the weight of raw materials.

Reaction temperature is usually in the range of 40°~250° C., preferably in the range of 80°~180° C.

A catalyst for accelerating the reaction can be used in the process of the invention. Exemplary catalysts include copper powder and copper compounds, and phase transfer catalysts such as crown ether, polyethylene glycol, quaternary ammonium base and quaternary phosphonium base.

In a reaction procedure of the invention, a prescribed amount of 3-or 4-aminophenol, base and solvent is charged to a reaction vessel in order to convert 3- or 4-aminophenol into an alkali metal salt, and 2,6-dichloro-3-trifluoromethylpyridine or 2,6-dichloro-4-trifluoromethylpyridine is successively added to progress the reaction. In another reaction procedure, the whole materials including 2,6-dichloro-3-trifluoromethylpyridine or 2,6-dichloro-4-trifluoromethylpyridine are charged at the same time and heated as intact to promote the reaction. No restriction is imposed upon the reaction procedure and any other procedures can also be suitably carried out.

When water is present in the reaction system, water can be removed out of the reaction system by ventilating nitrogen gas in the course of the reaction. Generally, a procedure for azeotropically removing water out of the reaction system is frequently carried out by using a small amount of benzene, toluene, xylene or chlorobenzene.

End point of the reaction can be determined according to decrease in the amount of the raw material by thin layer chromatography or high performance liquid chromatography.

After finishing the reaction, the reaction mixture is poured after concentration or as intact into water to obtain crude 2,6-bis(3- or 4-aminophenoxy)-3-or 4-trifluoromethylpyridine.

The crude diamine can be purified by recrystallization from or sludging with a solvent, or mineral acid salt formation by an aqueous HCl solution.

Aromatic diamine thus obtained is used as a requisite monomer for preparing polyimide or a polyimide copolymer of the invention, and these diamines can be used singly or as a mixture. In addition, other aromatic diamine can incorporate in the range giving no adverse effect on the good properties of polyimide.

Aromatic tetracarboxylic dianhydride which can be used in the invention is one or more compounds represented by the formula (4):

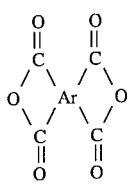

(4)

wherein Ar is same as above.

In the aromatic tetracarboxylic dianhydride of the formula (4), Ar is specifically monoaromatic radical of the formula (a):

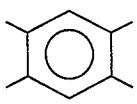

condensed polyaromatic radical of the formula (b):

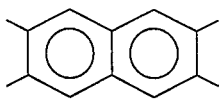

and noncondensed aromatic radical being connected to each other with a direct bond or a bridge member and having the formula (c):

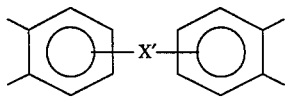

wherein X' is a direct bond, —CO—, —O—, —S—, —SO$_2$—, —CH$_2$—, —C(CH$_3$)$_2$—, —C(CF$_3$)$_2$—,

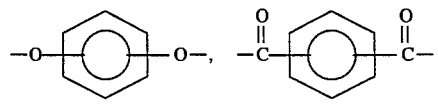

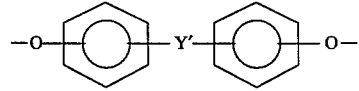

wherein Y' is a direct bond, —CO—, —O—, —S—, —SO$_2$—, —CH$_2$—, —C(CH$_3$)$_2$— or —C(CF$_3$)$_2$—.

Exemplary tetracarboxylic dianhydride of the formula (4) which can be used in the invention include, pyromellitic dianhydride,
3,3',4,4'-benzophenonetetracarboxylic dianhydride,
2,2',3,3'-benzophenonetetracarboxylic dianhydride,
3,3',4,4'-biphenyltetracarboxylic dianhydride,
2,2',3,3'-biphenyltetracarboxylic dianhydride,
2,2-bis(3,4-dicarboxyphenyl)propane dianhydride,
2,2-bis(2,3-dicarboxyphenyl)propane dianhydride,
bis(3,4-dicarboxyphenyl)ether dianhydride,
bis(3,4-dicarboxyphenyl)sulfone dianhydride,
1,1-bis(2,3-dicarboxyphenyl)ethane dianhydride,
bis(2,3-dicarboxyphenyl)methane dianhydride,
bis(3,4-dicarboxyphenyl)methane dianhydride,
2,2-bis(3,4-dicarboxyphenyl)-1,1,1,3,3,3-hexafluoropropane dianhydride,
2,3,6,7-naphthalenetetracarboxylic dianhydride,
1,4,5,8-naphthalenetetracarboxylic dianhydride,
1,2,5,6-naphthalenetetracarboxylic dianhydride,
1,2,3,4-benzenetetracarboxylic dianhydride,
3,4,9,10-perylenetetracarboxylic dianhydride,
2,3,6,7-anthracenetetracarboxylic dianhydride, and
1,2,7,8-phenanthrenetetracarboxylic dianhydride.

These dianhydrides can be used singly or as a mixture.

The ratio of aromatic tetracarboxylic dianhydride to aromatic diamine is usually adjusted in the preparation of polyimide in order to control the molecular weight of formed polyimide. In the process of the invention, an appropriate mole ratio of aromatic tetracarboxylic dianhydride to aromatic diamine in order to obtain polyimide of good melt-flowability is in the range of 0.9~1.0.

Polyimide of the invention obtain by using the above aromatic diamine and aromatic tetracarboxylic dianhydride as monomer components has requisite structural units comprising recurring structural units essentially represented by the formula (1).

A polyimide copolymer comprising recurring structural units represented by the above formula (1) and recurring structural units represented by the above formula (2) can be obtained by using as monomers a mixture of aromatic diamine of the invention with one or more other aromatic diamines and one or more aromatic tetracarboxylic dianhydrides.

The polyimide copolymer comprising recurring structural units represented by the formula (1) and recurring structural units represented by the formula (2) can be prepared in the presence of one or more aromatic diamines represented by the formula (9):

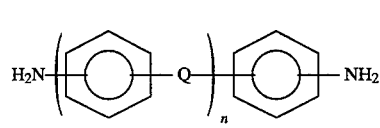

wherein n is an integer of 0~6 anti Q is a direct bond, —O—, —S—, —CO—, —SO$_2$—, —CH$_2$—, —C(CH$_3$)$_2$— or —C(CF$_3$)2- and when two or more bonding radicals Q connect aromatic rings to each other, the bonding radicals Q can be the same or different, by reacting aromatic diamine represented by the formula (3):

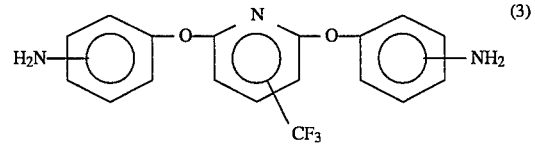

wherein positions of the trifluoromethyl radical and the amino radical are the same as above, with one or more tetracarboxylic dianhydride represented by the formula (10)

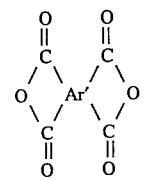

wherein Ar' is a tetravalent radical having 6 to 27 carbon atoms and being selected from the group consisting of a monoaromatic radical, condensed polyaromatic radical and noncondensed polyaromatic radical having aromatic radicals connected to each other with a direct bond or a bridge member.

Useful aromatic diamines represented by the formula (9) include, for example, m-phenylenediamine, o-phenylenediamine,
p-phenylenediamine, benzidine, 4,4'-diaminodiphenyl ether,
3,3'-diaminodiphenyl ether, 3,4'-diaminodiphenyl ether,
bis(3-aminophenyl)sulfide, (3-aminophenyl)(4-aminophenyl)sulfide,
bis(4-aminophenyl)sulfide, bis(3-aminophenyl)sulfone,
(3-aminophenyl)(4-aminophenyl)sulfone, bis(4-aminophenyl)sulfone,
3,3'-diaminobenzophenone, 3,4'-diaminobenzophenone,
4,4'-diaminobenzophenone, 3,3'-diaminodiphenylmethane,
3,4'-diaminodiphenylmethane, 4,4'-diaminodiphenylmethane, 2,2-bis(4-aminophenyl)propane, 2,2-bis(3-aminophenyl)propane,
(2-aminophenyl)-2-(4-aminophenyl)propane,
2,2-bis(4-aminophenyl)-1,1,1,3,3,3-hexafluoropropane,
2,2-bis(3-aminophenyl)-1,1,1,3,3,3-hexafluoropropane,
2-(3-aminophenyl)-2-(4-aminophenyl)-1,1,1,3,3,3-hexafluoropropane,
1,3-bis(3-aminophenoxy)benzene, 1,3-bis(4-aminophenoxy)benzene,
1,4-bis(3-aminophenoxy)benzene, 1,4-bis(4-aminophenoxy)benzene,
1,3-bis(3-aminobenzoyl)benzene, 1,3-bis(4-aminobenzoyl)benzene,
1,4-bis(3-aminobenzoyl)benzene, 1,4-bis(4-aminobenzoyl)benzene,
3,3'-diamino-4-phenoxybenzophenone, 4,4'-diamino-5-phenoxybenzophenone,
3,4'-diamino-4-phenoxybenzophenone, 3,4'-diamino-5'-phenoxybenzophenone,
4,4'-bis(4-aminophenoxy)biphenyl, 3,3'-bis(4-aminophenoxy)biphenyl,
3,4'-bis(3-aminophenoxy)biphenyl, bis[4-(4-aminophenoxy)phenyl]ketone,
bis[4-(3-aminophenoxy)phenyl]ketone,
bis[3-(4-aminophenoxy)phenyl]ketone,
bis[3-(3-aminophenoxy)phenyl]ketone,
3,3'-diamino-4,4'-diphenoxybenzophenone,
4,4'-diamino-5,5'-diphenoxybenzophenone,
3,4'-diamino-4,5'-diphenoxybenzophenone,
bis[4-(4-aminophenoxy)phenyl]sulfide,
bis[4-(3-aminophenoxy)phenyl]sulfide,
bis[3-(4-aminophenoxy)phenyl]sulfide,
bis[3-(3-aminophenoxy)phenyl]sulfide,
bis[4-(4-aminophenoxy)phenyl]sulfone,
bis[4-(3-aminophenoxy)phenyl]sulfone,
bis[3-(4-aminophenoxy)phenyl]sulfone,
bis[3-(3-aminophenoxy)phenyl]sulfone,
bis[4-(4-aminophenoxy)phenyl]ether, bis[4-(3-aminophenoxy)phenyl]ether,
bis[3-(4-aminophenoxy)phenyl]ether, bis[3-(3-aminophenoxy)phenyl]ether,
bis[4-(4-aminophenoxy)phenyl]methane,
bis[4-(3-aminophenoxy)phenyl]methane,
bis[3-(4-aminophenoxy)phenyl]methane,
bis[3-(3-aminophenoxy)phenyl]methane,
2,2-bis[4-(3-aminophenoxy)phenyl]propane,
2,2-bis[4-(4-aminophenoxy)phenyl]propane,
2,2-bis[3-(3-aminophenoxy)phenyl]propane,
2,2-bis[3-(4-aminophenoxy)phenyl]propane,
2,2-bis[4-(3-aminophenoxy)phenyl]-1,1,1,3,3,3-hexafluoropropane,
2,2-bis[4-(4-aminophenoxy)phenyl]-1,1,1,3,3,3-hexafluoropropane,
2,2-bis[3-(3-aminophenoxy)phenyl]-1,1,1,3,3,3-hexafluoropropane,
2,2-bis[3-(4-aminophenoxy)phenyl]-1,1,1,3,3,3-hexafluoropropane,
1,4-bis[4-(3-aminophenoxy)benzoyl]benzene,
1,3-bis[4-(3-aminophenoxy)benzoyl]benzene,
1,3-bis(3-amino-4-phenoxybenzoyl)benzene,
1,4-bis(3-amino-4-phenoxybenzoyl)benzene,
1,3-bis(4-amino-5-phenoxybenzoyl)benzene,
1,4-bis(4-amino-5-phenoxybenzoyl)benzene,
4,4'-bis[3-(4-aminophenoxy)benzoyl]diphenyl ether,
4,4'-bis[3-(3-aminophenoxy)benzoyl]diphenyl ether,
4,4'-bis[4-(4-amino-α,α-dimethybenzyl)phenoxy]benzophenone,
4,4'-bis[4-(4-amino-α,α-dimethybenzyl)phenoxy]diphenyl sulfone,
bis[4-{4-(4-aminophenoxy) phenoxy} phenyl]sulfone,
3,3'-diamino-4,4'-dibiphenoxybenzophenone,
4,4'-diamino-5,5'-dibiphenoxybenzophenone,
3,4'-diamino-4,5'-dibiphenoxybenzophenone,
1,3-bis(3-amino-4-biphenoxybenzoyl)benzene,
1,4-bis(3-amino-4-biphenoxybenzoyl)benzene,
1,3-bis(4-amino-5-biphenoxybenzoyl)benzene,
1,4-bis(4-amino-5-biphenoxybenzoyl)benzene,
1,4-bis[4-(4-aminophenoxy)phenoxy-α,α-dimethybenzyl]benzene,
1,3-bis[4-(4-aminophenoxy)phenoxy-α,α-dimethybenzyl]benzene,
1,3-bis[4-(4-amino-6-trifluoromethylphenoxy)-α,α-dimethybenzyl]benzene,
1,3-bis[4-(4-amino-6-fluorophenoxy)-α,α-dimethybenzyl]benzene,
1,3-bis[4-(4-amino-6-methylphenoxy)-α,α-dimethybenzyl]benzene,
1,3-bis[4-(4-amino-6-cyanophenoxy)-α,α-dimethybenzyl]benzene,
1,3-bis(3-amino-4-biphenoxybenzoyl)benzene,
1,4-bis(3-amino-4-biphenoxybenzoyl)benzene,
1,3-bis(4-amino-5-biphenoxybenzoyl)benzene, and
1,4-bis(4-amino-5-biphenoxybenzoyl)benzene.

These aromatic diamines can be used singly or as a mixture.

Any compounds enumerated as examples of the above general formula (4) can be used as tetracarboxylic dianhydride represented by the formula (10) which is used for another monomer. Tetracarboxylic dianhydride represented by the formula (10) can be the same as or differ from the tetracarboxylic anhydride represented by the formula (4). Tetracarboxylic dianhydride for use in the preparation of the polyimide copolymer can be used singly or as a mixture.

In the preparation of polyimide or a polyimide copolymer, proportion of the aromatic diamine component and the aromatic tetracarboxylic dianhydride component is 1~0.01 parts by mole of aromatic diamine represented by the formula (3) and 1~0.01 parts by mole of aromatic tetracarboxylic dianhydride represented by the formula (4), and additionally 0~0.99 parts by mole of aromatic diamine represented by the formula (9) and 0~0.99 parts by mole of aromatic tetracarboxylic dianhydride represented by the formula (10). In the case of the polyimide copolymer, proportion of aromatic diamine represented by the formula (3) is preferably 0.5 parts by mole or more, more preferably 0.7 parts by mole or more.

Polyimide and the polyimide copolymer of the invention includes a homopolymer and copolymer having at the polymer chain end an aromatic ring which is unsubstituted or substituted with a radical having no reactivity with amine or dicarboxylic anhydride, and a composition comprising the homopolymer or copolymer. These types of product sometimes exhibit better properties.

Polyimide and the polyimide copolymer having at the polymer chain end an aromatic ring which is unsubstituted or substituted with a radical having no reactivity with amine or dicarboxylic anhydride can be obtained from the homopolymer and copolymer which are derived from aromatic diamine essentially represented by the formula (3) or a mixture thereof with other aromatic diamine and one or more tetracarboxylic dianhydride essentially represented by the formula (4), by capping with aromatic dicarboxylic anhydride represented by the formula (5):

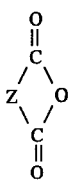

(5)

wherein Z is the same as above, or aromatic monoamine represented by the formula (6):

Z₁—NH₂ (6)

wherein $Z_1$ is the same as above, preferably with phthalic anhydride or aniline.

This type of polyimide can be prepared by reacting the aromatic diamine component with aromatic tetracarboxylic dianhydride in the presence of aromatic dicarboxylic anhydride represented by the formula (5) or aromatic monoamine represented by the formula (6), and successively by thermally or chemically imidizing the resultant polyamic acid.

Exemplary aromatic dicarboxylic anhydrides represented by the formula (5) include
phthalic anhydride, 2,3-benzophenonedicarboxylic anhydride,
3,4-benzophenonedicarboxylic anhydride,
2,3-dicarboxyphenyl phenyl ether anhydride,
3,4-dicarboxyphenyl phenyl ether anhydride,
2,3-biphenyldicarboxylic anhydride,
3,4-biphenyldicarboxylic anhydride,
2,3-dicarboxyphenyl phenyl sulfone anhydride,
3,4-dicarboxyphenyl phenyl sulfone anhydride,
2,3-dicarboxyphenyl phenyl sulfide anhydride,
3,4-dicarboxyphenyl phenyl sulfide anhydride,
1,2-naphthalenedicarboxylic anhydride,
2,3-naphthalenedicarboxylic anhydride,
1,8-naphthalenedicarboxylic anhydride,
1,2-anthracenedicarboxylic anhydride,
2,3-anthracenedicarboxylic anhydride, and
1,9-anthracenedicarboxylic anhydride.

These dicarboxylic anhydrides can be substituted with a radical having no reactivity for amine and dicarboxylic anhydride.

Phthalic anhydride is most preferred in these dicarboxylic anhydrides from the standpoint of properties and practical use of resulting polyimide. That is, resulting polyimide has excellent stability in high temperature processing and is very useful, for example, for structural materials, space and aeronautic equipment, electric and electronic appliances, adhesives in view of high heat resistance and excellent processability.

When phthalic anhydride is used, no restriction is put upon the replacement of a portion of phthalic anhydride by other dicarboxylic anhydride in the range giving no adverse effect on the good properties of polyimide.

Amount of dicarboxylic anhydride is in the range of 0.001~1.0 mol per mol of aromatic diamine. Use of less than 0.001 mol lead to viscosity increase in high temperature processing and causes reduction of processability.

On the other hand, the amount exceeding 1.0 mol leads to decrease in mechanical properties. Thus, preferred range of use is 0.01~0.5 mol.

Aromatic monoamines which can be used include, for example,
aniline, o-toluidine, m-toluidine, p-toluidine, 2,3-xylidine, 2,6-xylidine, 3,4-xylidine, 3,5-xylidine, o-chloroaniline, m-chloroaniline, p-chloroaniline, o-bromoaniline, m-bromoaniline,
p-bromoaniline, o-nitroaniline, m-nitroaniline, p-nitroaniline,
o-aminophenol, m-aminophenol, p-aminophenol, o-anisidine, m-anisidine,
p-anisidine, o-phenetidine, m-phenetidine, p-phenetidine,
o-aminobenzaldehyde, m-aminobenzaldehyde, p-aminobenzaldehyde,
o-aminobenzonitrile, m-aminobenzonitrile, p-aminobenzonitrile,
2-aminobiphenyl, 3-aminobiphenyl, 4-aminobiphenyl,
2-aminophenyl phenyl ether, 3-aminophenyl phenyl ether,
4-aminophenyl phenyl ether, 2-aminobenzophenone, 3-aminobenzophenone,
4-aminobenzophenone, 2-aminophenyl phenyl sulfide,
3-aminophenyl phenyl sulfide, 4-aminophenyl phenyl sulfide,
2-aminophenyl phenyl sulfone, 3-aminophenyl phenyl sulfone,
4-aminophenyl phenyl sulfone, α-naphthylamine, β-naphthylamine,
1-amino-2-naphthol, 2-amino-1-naphthol, 4-amino-1-naphthol,
5-amino-1-naphthol, 5-amino-2-naphthol, 7-amino-2-naphthol,
8-amino-1-naphthol, 8-amino-2-naphthol, 1-aminoanthracene,
2-aminoanthracene and 9-aminoanthracene.

These aromatic monoamines can be substituted with a radical having no reacting for amine and dicarboxylic anhydride.

These aromatic monoamines can be substituted with a radical having no reactivity with amine and dicarboxylic anhydride.

Amount of aromatic monoamine is 0.001~1.0 mol per mol of tetracarboxylic dianhydride. The amount less than 0.001 mol ratio leads to viscosity increase in high temperature processing and reduction of processability. On the other hand, the amount exceeding 1.0 mol ratio results in reduction of mechanical properties. Thus, preferred amount is in the range of 0.01~0.5 mol ratio.

A suitable mol ratio of aromatic tetracarboxylic dianhydride to aromatic diamine in order to obtain polyimide having good melt flowability as above is in the range of 0.9~1.0. Consequently, in the case of preparing polyimide having an unsubstituted or substituted aromatic ring at the polymer chain end thereof, proportion of aromatic tetracarboxylic dianhydride, aromatic diamine and dicarboxylic anhydride or aromatic monomer is 0.9~1.0 mol of aromatic diamine and 0.001~1.0 mol of dicarboxylic anhydride or aromatic monoamine per mol of tetracarboxylic dianhydride.

Any preparation process of polyimide including known processes can be applied to prepare polyimide of the invention. A process for carrying out the reaction in an organic solvent is particularly preferred.

A preferred solvent for such reaction is N,N-dimethylacetamide. Other useful solvents include, for example,
N,N-dimethylformamide, N,N-diethylacetamide,
N,N-dimethylmethoxyacetamide, N-methyl-2-pyrrolidone,
1,3-dimethyl-2-imidazolidinone, N-methylcaprolactam,
1,2-dimethoxyethane, bis(2-methoxyethyl)ether,
1,2-bis(2-methoxyethoxy)ethane, bis[2-(2-methoxyethoxy)ethyl]ether,
tetrahydrofuran, 1,3-dioxane, 1,4-dioxane, pyridine, picoline,
dimethyl sulfoxide, dimethyl sulfone, tetramethylurea,
hexamethylphosphoramide, phenol, o-cresol, m-cresol, p-cresol, m-cresylic acid, p-chlorophenol, anisole, benzene, toluene and xylenes. These organic solvents can be used singly or as a mixture.

In the process of the invention, exemplary processes for carrying out reaction by addition of an aromatic diamine, aromatic tetracarboxylic dianhydride and aromatic dicarboxylic anhydride or aromatic monoamine to an organic solvent include, (1) a process for reacting the aromatic diamine with the aromatic tetracarboxylic dianhydride and successively adding the aromatic dicarboxylic anhydride to continue the reaction, (2) a process for reacting the aromatic diamine with the aromatic dicarboxylic anhydride and successively adding the aromatic tetracarboxylic dianhydride to continue the reaction, (3) a process for simultaneously adding the aromatic tetracarboxylic dianhydride and the aromatic dicarboxylic anhydride to the aromatic diamine and carrying out the reaction, (4) a process for reacting the aromatic tetracarboxylic dianhydride with the aromatic diamine and successively adding the aromatic monoamine to continue the reaction, (5) a process for reacting the aromatic tetracarboxylic dianhydride with the aromatic monoamine and successively adding the aromatic diamine to continue the reaction, and (6) a process for simultaneously adding the aromatic diamine and the aromatic monoamine to the aromatic tetracarboxylic dianhydride and carrying out the reaction. Any process above can be carried out.

Reaction temperature is usually 250° C. or less, preferably 60° C. or less. No particular restriction is imposed upon the reaction pressure. The reaction can be satisfactorily carried out under atmospheric pressure. The reaction time differs depending upon the reaction temperature and the kinds of aromatic diamine, aromatic tetracarboxylic dianhydride, aromatic dicarboxylic anhydride, aromatic monoamine and solvent. The reaction time of 4–24 hours is usually sufficient.

The above processes can provide polyamic acid having as requisite structural units one or more species of recurring structural units represented by the general formula (1-3):

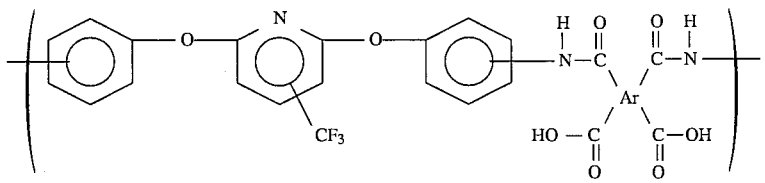

(1-3)

wherein Ar is a tetravalent radical having 6–27 carbon atoms and being selected from the group consisting of a monoaromatic radical, condensed polyaromatic radical and noncondensed polyaromatic radical having aromatic radicals connected to each other with a direct bond or a bridge member, a trifluoromethyl radical is situated at the 3- or the 4-position on a pyridine nucleus, and an amide nitrogen atom is connected at the 3- or the 4-position to an ether bond.

Polyamic acid thus obtained is dehydrated by heating at 100°–400° C. or chemically imidized by using common imidizing agents such as triethylamine and acetic anhydride to give polyimide having as a fundamental skeleton the recurring structural units represented by the above general formula (1) which corresponds to polyamic acid.

Polyimide is generally prepared by forming polyamic acid at a decreased temperature and thereafter thermally or chemically imidizing polyamic acid as described above.

Polyimide can also be prepared by carrying out formation and thermal imidization of polyamic acid at the same time in the temperature range of 60°–250° C.

That is, aromatic diamine, aromatic tetracarboxylic dianhydride and aromatic dicarboxylic anhydride or aromatic monoamine are suspended or dissolved in an organic solvent and reacted with heating. Thus formation and dehydrating imidization of polyamic acid can be simultaneously carried out to give polyimide having as a fundamental skeleton recurring structural units represented by the above general formula (1).

The solution obtained by dissolving the polyamic acid precursor of polyimide of the invention in N,N-dimethylacetamide in a concentration of 0.5 g/dl has an inherent viscosity of 0.01–3.0 dl/g at 35° C. The solution obtained by heat-dissolving the polyimide powder of the invention in a solvent mixture of P-chlorophenol/phenol (9/1 by weight) in a concentration of 0.5 g/dl has an inherent viscosity of 0.01–3.0 dl/g at 35° C.

The polyimide film of the invention can be prepared by casting on a glass plate a varnish of polyamic acid precursor of the polyimide and heating to carry out imidization, by hot-pressing the polyimide powder as intact to form a film or by removing an organic solvent upon heating from the solution dissolved the polyimide to form a film. That is, films and powder of polyimide can be prepared by conventionally known methods.

The polyimide based resin composition of the invention comprises 100 parts by weight of the polyimide or polyimide copolymer of the invention and 5–70 parts by weight, preferably 10–50 parts by weight of fibrous reinforcements such as carbon fiber, glass fiber, aromatic polyamide fiber and potassium titanate fiber. When the amount of the fibrous reinforcements is less than 5 parts by weight, sufficient reinforcing effect cannot be obtained. On the other hand, the amount exceeding 70 parts by weight makes difficult to obtain good molded articles by injection molding or other melt processing methods.

The polyimide based resin composition of the invention can be prepared by a conventionally known process.

Addition of the reinforcements to the polyimide resin can be carried out by usually known methods. For example, in the most common method, polyimide powder and reinforcements are premixed with a mortar, Henschel mixer, drum blender, ball mill and ribbon blender and successively kneaded with a melt mixer or hot rolls to obtain pellets or powdery mixture.

The polyimide resin composition of the invention can be practically applied to melt-processing such as injection molding, extrusion forming, compression molding, rotary molding and other various known processing methods.

Polyimide used in the invention has excellent melt flowability in particular, and thus the polyimide resin composition of the invention can be most preferably applied to injection molding process in view of operation efficiency.

In the case of melt-processing the polyimide of the invention, other thermoplastic resin can be blended in a suitable amount depending upon the object for use as long as giving no adverse effect on the good properties of polyimide.

Thermoplastic resins which can be blended include, for example, polyethylene, polypropylene, polycarbonate, polyarylate, polyamide, polysulfone, polyether sulfone, polyether ketone, polyether ether ketone, polyphenylene sulfide, polyamideimide, polyetherimide, modified polyphenyleneoxide, polyimide and other kinds of polyimides.

Solid lubricants such as molybdenum disulfide, graphite, boron nitride, lead monoxide and lead powder can also be added singly or as a mixture.

Fillers which are used for common resin compositions can be added in the range not impairing the object of the invention. Exemplary fillers include graphite, carborundum, silica powder, molybdenum disulfide, fluoro resin and other wear resistance improvers; antimony trioxide, magnesium carbonate, calcium carbonate and other retardance improvers; clay, mica and other electrical property improvers; asbestos, silica, graphite and other tracking resistance improvers; barium sulfide, silica, calcium metasilicate and other acid resistance improvers; iron powder, zinc powder, copper powder and other thermal conductivity improvers; and other miscellaneous materials such as glass beads, glass balloons, talc, diatomaceous earth, alumina, silicate balloons, hydrated alumina, metal oxide and colorants.

The invention will hereinafter be illustrated in detail by way of examples. Properties of polyimide in the examples were measured by the following methods.

Inherent viscosity: Polyamic acid was dissolved in N,N-dimethylacetamide and polyimide was dissolved in a solvent mixture of p-chlorophenol/phenol (9/1 weight ratio), respectively in a concentration of 0.5 g/100 ml, and measured at 35° C.
Glass transition temperature (Tg): Measured by DSC with a DSC-A1M (Shimadzu DT-40 Series).
5% Weight loss temperature (Td 5): Measured by DTG in the air with a DTG-40M (Shimadzu DT-40 Series).
Yellowness index (YI): measured by transmission method (JIS K-7103) with SM color computer (Suga Sikenki SM-6-IS-2B).
Light transmittance (T%): measured with a Shimazu UV-160.
Dielectric constant: measured by ASTM-D-150-87.
Infrared absorption spectrum: measured with JASCO FT/IR-300.
Flow initiation temperature : Measured with a Shimadzu Koka Type Flow Tester CFT-500A under load of 100 kg at a temperature increases rate of 5° C./min.
Melt viscosity: Measured with a Shimadzu Koka Type Flow Tester CFT-500A under load of 100 kg.
Linear expansion coefficient: merasured by ASTM-696-79.

Example 1

To a four necked flask equipped with a thermometer, reflux condenser and stirrer, 400 g of N,N-dimethylformamide (DMF), 40 g of toluene, 45.3 g (0.21 mol) of 2,6-dichloro-4-trifluoromethylpyridine, 48.1 g (0.441 mol) of m-aminophenol, and 31.9 g (0.231 mol) of potassium carbonate were charged, heated to 130° C. with stirring and aged at 130° C. for 5 hours. After finishing the reaction, the reaction mixture was cooled to room temperature and filtered to remove inorganic salts.

To the filtrate, 480 g of water was added and organic layer was separated. To the organic layer, 1 liter of water was added to obtain crude crystals. Crude crystals were recrystallized from isopropanol (IPA) to obtain 50.4 g (66% yield) of the desired product 2,6-bis(3-aminophenoxy)-4-trifluoromethylpyridine.

Melting point: 112.8°~113.2° C.

Elemental analysis ($C_{18}H_{14}N_3O_2F_3$)

|  | C | H | N | F |
|---|---|---|---|---|
| Calculated (%) | 59.84 | 3.91 | 11.63 | 15.77 |
| Found (%) | 59.79 | 3.95 | 11.61 | 15.74 |

1H-NMR δ(CDCl$_3$, ppm) 3.68 (4H (1), S), 6.38~6.58 (6H (2), m), 6.68 (1H (3), S), 6.95~7.46 (2H (4), m), Wherein (1)~(4) are positions on the following formula.

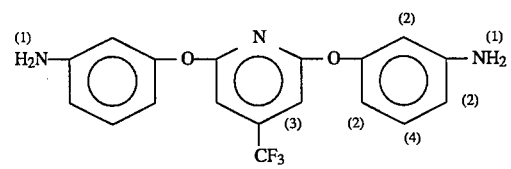

Example 2

To a four necked flask equipped with a thermometer, reflux condenser and stirrer, 400 g of N,N-dimethylformamide (DMF), 40 g of toluene, 45.3 g (0.21 mol) of 2,6-dichloro-3-trifluoromethylpyridine, 48.1 g (0.44 mol) of m-aminophenol and 31.9 g (0.231 mol) of potassium carbonate were charged, heated to 130° C. with stirring and aged at 130° C. for 6 hours, After finishing the reaction, the reaction mixture was cooled to room temperature and filtered to remove organic salts. DMF was distilled off from the filtrate. The residue was dissolved in 300 g of isopropanol (IPA) and 184 g of 36 % HCl was added to the solution.

The precipitated hydrochloride was dissolved in 200 g of water, neutralized with a 28% aqueous ammonia solution and extracted with 1,2-dichloroethane (EDC). The EDC layer was washed with water and distilled off the solvent to obtain 33.1 g (44% yield) of the desired product 2,6-bis(3-aminophenoxy)-3-trifluoromethylpyridine.

Melting point: 103.0°~104.2° C.

Elemental analysis ($C_{18}H_{14}N_3O_2F_3$)

|  | C | H | N | F |
|---|---|---|---|---|
| Calculated (%) | 59.84 | 3.91 | 11.63 | 15.77 |
| Found (%) | 59.80 | 3.93 | 11.59 | 15.71 |

1H-NMR δ(CDCl$_3$, ppm) 3.66 (4H (1), S), 6.37~6.60 (7H (2), m), 6.88~7.08 (2H (3), m), 7.85 (1H (4), d), Wherein (1)~(4) are positions on the following formula.

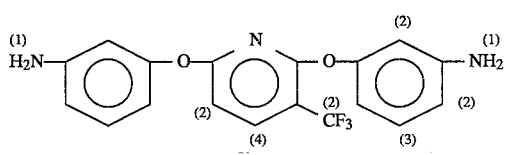

Example 3

To a reaction vessel equipped with a stirrer, thermometer, reflux condenser and nitrogen inlet tube, 7.2264 g Examples 4~6 and Comparative Examples 1~2

Various kinds of polyimide film were prepared by carrying out the same procedures as described in Example 3 except that diamine components and tetracarboxylic dianhydride components were used as illustrated in Table 1.

Table 1 illustrates diamine components, tetracarboxylic dianhydride components, inherent viscosity of polyamic acid, glass transition temperature (Tg), 5% weight loss temperature (Td 5), yellowness index (YI), light transmittance at 500 nm and dielectric constant, together with results of Example 3.

TABLE 1

|  | Diamine component | Acid anhydride component | η inh (dl/g) | Tg (°C.) | Td 5[1] (°C.) | YI[2] | T %[3] (%) | Dielectric constant 60 Hz | 3 kHz | 1 MHz |
|---|---|---|---|---|---|---|---|---|---|---|
| Example 3 | m,m-APP-CF$_3$ I[4] 7.2264 g (0.02 mol) | 6FDA[5] 8.7961 g (0.0198 mol) | 0.61 | 194 | 505 | 6 | 86 | 2.94 | 2.92 | 2.90 |
| Example 4 | ↑ | BPDA[6] 5.8256 g (0.0198 mol) | 0.72 | 197 | 506 | 10 | 85 | 3.14 | 3.10 | 3.08 |
| Example 5 | m,m-APP-CF$_3$ II[7] 7.2264 g (0.02 mol) | 6FDA 8.761 g (0.0198 mol) | 0.45 | 204 | 508 | 7 | 86 | 2.93 | 2.90 | 2.88 |
| Example 6 | ↑ | BPDA 5.8256 g (0.0198 mol) | 0.59 | 209 | 509 | 12 | 84 | 3.11 | 3.08 | 3.05 |
| Com. Example 1 | m,m-APP[8] 5.8665 g (0.02 mol) | 6FDA 8.7961 g (0.0198 mol) | 0.92 | 203 | 510 | 12 | 81 | 3.09 | 3.05 | 3.01 |
| Com. Example 2 | ↑ | BPDA 5.8256 g (0.0198 mol) | 1.04 | 205 | 513 | 15 | 80 | 3.35 | 3.29 | 3.27 |

[1] 5% Weight loss temperature
[2] Yellowness Index
[3] Light transmittance at 500 mm
[4] 2,6-Bis(3-aminophenoxy-4-trifluormethylpyridine
[5] 2,2-Bis(3,4-dicarboxyphenyl)-1,1,1,3,3,3-hexafluoropropane dianhydride
[6] Biphenyltetracarboxylic dianhydride
[7] 2,6-Bis(3-aminophenoxy)-3-trifluoromethylpyridine
[8] 2,6-Bis(3-aminophenoxy)pyridine (0.02 mol) of 2,6-bis (3-aminophenoxy)-4-trifluoromethylpyridine and 64.09 g of N,N-dimethylacetamide were charged and 8.7961 g (0.0198 mol) of 2,2-bis(3,4-dicarboxyphenyl)-1,1,1,3,3,3-hexafluoropropane dianhydride was added by portions with caution to prevent temperature rise of the solution. After finishing the addition, the mixture was stirred for 4 hours at room temperature. Thereafter 0.0592 g (0.0004 mol) of phthalic anhydride was charged and stirred for 24 hours at room temperature. Polyamic acid thus obtained has an inherent viscosity of 0.61 dl/g and was in a state of good varnish.

A portion of the above polyamic acid was cast on a glass plate and heated to 100° C., 200° C. and 250° C. respectively, over an hour each, maintained individually at 100° C. and 200° C. for an hour each and successively at 250° C. for 4 hours.

The polyimide film thus obtained had a thickness of 49.8 μm a glass transition temperature of 194° C. and 5% weight loss temperature of 505° C. The film also had an yellowness index of 6, light transmittance of 86% at 500 nm, dielectric constant of 2.94 at a frequency of 60 Hz, 2.92 at 3 KHz, and 2.90 at 1 MHz.

An infrared absorption spectrum atlas of the polyimide film is illustrated in FIG. 1. In the spectrum atlas, absorption at around 1780 cm$^{-1}$ and 1720 cm$^{-1}$ which are characteristic absorption band of imide is remarkably observed.

Example 7

To a reaction vessel equipped with a stirrer, thermometer reflux condenser, water separator and nitrogen inlet tube, 7.2264 g (0.02 mol) of 2,6-bis(3-aminophenoxy)-4-trifluoromethylpyridine, 8.5296 g (0.0192 mol) of 2,2-bis(3,4-dicarboxyphenyl)-1,1,1,3,3,3-hexafluoropropane dianhydride, 0.2370 g (0.0016 mol) of phthalic anhydride, 20 g of toluene and 63.02 g of m-cresol were charged and heated to 150° C. with stirring in a nitrogen atmosphere. Thereafter the reaction was carried out at 150° C. for 4 hours while distilling out 0.7 ml of water.

After finishing the reaction, the reaction mixture was cooled to room temperature and poured into 1 liter of methanol. Precipitated polyimide was filtered, washed with methanol, and dried under reduced pressure to obtain 15.4 g (96.3% yield) of polyimide powder. The polyimide powder thus obtained has an inherent viscosity of 0.48 dl/g, glass transition temperature of 185° C., and 5% weight loss temperature of 505° C. The polyimide powder also had a melt flow initiation temperature of 280° C. and melt viscosity of 3520 poise at 340° C.

Comparative Example 3

The same procedures as described in Example 7 was carried out without using phthalic anhydride. Polyimide powder thus obtained was 15.3 g (95.7%) and had an inherent viscosity of 0.49 dl/g, glass transition temperature of 191° C., and 5% weight loss temperature of 508° C. The polyimide powder also had a melt flow initiation temperature of 285° C. and melt viscosity of 3920 poise at 340° C.

Weight loss of the polyimide powder obtained in this comparative example was measured by changing the residence time at 350° C. in air. The results are illustrated in FIG. 2 together, with the results of Example 7.

As sure in FIG. 2, the polyimide powder obtained increases amount of loss with prolonged residence time and is inferior in stability against heat oxidation to the polyimide powder obtained in Example 7.

Examples 8~10

Various polyimide powder was prepared by carrying out the same procedures as described in Example 7 except that diamine components and tetracarboxylic dianhydride components were used as illustrated in Table 2. Table 2 illustrates diamine components, tetracarboxylic dianhydride components, yield, inherent viscosity of polyimide powder, glass transition temperature (Tg), 5% weight loss temperature (Td 5), melt flow initiation temperature and melt viscosity at 340° C., together with the results of Example 7.

Examples 12~20

Various polyimide films were prepared by using diamine components and tetracarboxylic dianhydride components as illustrated in Table 3 and carrying out the same procedures as described in Example 11. Table 3 illustrates diamine components, tetracarboxylic dianhydride components, inherent viscosity of polyamic acid, glass transition temperature (Tg), 5% weight loss temperature, yellowness index (YI), light transmittance at 500 nm (T %) and dielectric constant, together with the results of Example 11.

TABLE 2

|  | Diamine component | Acid anhydride component | Yield (%) | η inh (dl/g) | Tg (°C.) | Td 5 (°C.) | F.S.T[1] (°C.) | Melt[2] viscosity (poise) |
|---|---|---|---|---|---|---|---|---|
| Example 7 | m,m-APP-CF$_3$ I 7.2264 g (0.02 mol) | 6FDA 8.5296 g (0.0192 mol) | 96.3 | 0.48 | 185 | 505 | 280 | 3520 |
| Example 8 | ↑ | BPDA 5.6490 g (0.0192 mol) | 96.5 | 0.53 | 186 | 503 | 275 | 3400 |
| Example 9 | m,m-APP-CF$_3$ II 7.2264 g (0.02 mol) | 6FDA 8.5296 g (0.0192 mol) | 95.8 | 0.29 | 197 | 509 | 285 | 3860 |
| Example 10 | ↑ | BPDA 5.6490 g (0.0192 mol) | 95.5 | 0.43 | 201 | 510 | 290 | 4120 |

[1]Melt flow initiation temperature
[2]Value at 340° C.
Other symbols are the same as Table 1.

Example 11

To a reaction vessel equipped with a stirrer, reflux condenser and nitrogen inlet tube, 5.0589 g (0.014 mol) of 2,6-bis(3-aminophenoxy)-4-trifluoromethylpyridine obtained in Example 2, 1.2016 g (0.006 mol) of 3,3'-diaminodiphenyl ether and 60.23 g of N,N-dimethylacetamide were charged, and 8.7962 g (0.0198 mol) of 2,2-bis(3,4-dicarboxyphenyl)-1,1,1,3,3,3-hexafluoropropane dianhydride was added by portions at room temperature in a nitrogen atmosphere with caution to prevent temperature rise of the solution. After addition, the mixture was stirred for 4 hours at room temperature. Thereafter 0.0592 g (0.0004 mol) of phthalic anhydride was charged and stirred for 74 hours at room temperature. Polyamic acid thus obtained had an inherent viscosity of 0.66 dl/g.

A portion of the above polyamic acid was cast on a glass plate and heated to 100° C., 200° C. and 250° C., respectively, over an hour each and maintained individually at 100° C. and 200° C. for an hour each and successively at 250° C. for 4 hours. The polyimide film thus obtained had a thickness of 52.3 μm, glass transition temperature of 206° C. and 5% weight loss temperature of 518° C. The film also had a yellowness index of 8, light transmittance of 85% at 500 nm, and a dielectric constant of 2.98 at a frequency of 60 Hz, 2.93 at 3 KHz and 2.91 at 1 MHz.

TABLE 3

| Example | Diamine Component A (mol) | Diamine Component B (mol) | Acid anhydride Component C (mol) | Acid anhydride Component D (mol) | η inh (dl/g) | T g (°C.) | Td 5[8] (°C.) | YI[9] | T %[10] | Dielectric constant 60 Hz | Dielectric constant 3 kHz | Dielectric constant 1 MHz |
|---|---|---|---|---|---|---|---|---|---|---|---|---|
| 11 | m,m-APP-CF$_3$-I 0.014[1] | 3,3'-ODA[2] 0.006 | 6FDA[3] 0.0198 | 0 | 0.66 | 206 | 518 | 8 | 85 | 2.98 | 2.93 | 2.91 |
| 12 | ↑ | m,m-APB[4] 0.006 | ↑ | ↑ | 0.74 | 191 | 523 | 7 | 87 | 2.98 | 2.94 | 2.91 |
| 13 | m,m-APP-CF$_3$ I 0.02 | 0 | 6FDA 0.01386 | BPDA[5] 0.00594 | 0.82 | 210 | 514 | 9 | 83 | 3.03 | 2.99 | 2.96 |
| 14 | ↑ | ↑ | ↑ | ODPA[6] 0.00594 | 0.63 | 189 | 517 | 9 | 84 | 3.02 | 2.98 | 2.96 |
| 15 | m,m-APP-CF$_3$-I 0.014 | m,m-APB 0.006 | ↑ | BPDA 0.00594 | 0.69 | 184 | 513 | 8 | 85 | 3.00 | 2.97 | 2.94 |
| 16 | m,m-APP-CF$_3$-II 0.014[7] | 3,3'-ODA 0.006 | 6FDA 0.0198 | 0 | 0.74 | 203 | 510 | 8 | 84 | 2.95 | 2.91 | 2.89 |
| 17 | ↑ | m,m-APB 0.006 | ↑ | ↑ | 0.84 | 193 | 507 | 9 | 83 | 2.96 | 2.92 | 2.90 |
| 18 | m,m-APP-CF$_3$-II 0.02 | 0 | 6FDA 0.01386 | BPDA 0.00594 | 0.77 | 200 | 509 | 10 | 82 | 2.99 | 2.98 | 2.95 |
| 19 | ↑ | ↑ | ↑ | ODPA 0.00594 | 0.68 | 194 | 513 | 10 | 83 | 3.02 | 3.00 | 2.96 |
| 20 | m,m-APP-CF$_3$-II 0.014 | m,m-APB 0.006 | ↑ | BPDA 0.00594 | 0.71 | 188 | 514 | 9 | 83 | 3.01 | 2.98 | 2.95 |

[1] 2,6-Bis(3-aminophenoxy)-4-trifluoromethylpyridine
[2] 3,3-Diaminodiphenylether
[3] 2,2-Bis(3,4-dicarboxyphenyl)-1,1,1,3,3,3-hexafluoromethylpropane dianhydride
[4] 1,3-Bis(3-aminophenoxy)benzene
[5] 3,3',4,4'-Biphenyltetracarboxylic dianhydride
[6] 3,3',4,4'-Diphenylethertetracarboxylic dianhydride
[7] 2,6-Bis(3-aminophenoxy)-3-trifluoromethylpyridine
[8] 5% Weight loss temperature
[9] Yellowness index
[10] Light transmittance at 500 mm Examples 21~30

Various polyamic acid varnishes obtained in the above examples were mixed with a silane treated glass fiber CS-3PE-467S (Trade Mark of Nitto Boseki Co.) having a fiber length of 3 mm and fiber size of 13 μm. The glass fiber was used in an amount as illustrated in Table 4 for 100 parts by weight of the varnish as converted to the weight of polyimide. The mixture was thoroughly stirred and homogenized. Polyimide films were prepared from the mixture by the same procedures as carried out in Example 1. Table 4 illustrates the dielectric constant and coefficient of linear expansion in accordance with ASTM-696-76.

Comparative Examples 4~7

The same procedures as described in Examples 21~24 were carried out except that the glass fiber was used in an amount outside the scope of the invention. Properties of resultant films were measured and results are illustrated in Table 4 together with results of Examples 21~30.

Comparative Examples 8~9

The glass fiber was added to the polyamic acid varnishes obtained in Comparative Examples 1 and 2 by the same procedures as carried out in Examples 21~24. Properties of resultant films were measured and results are illustrated in Table 4 together with results of Examples 21~30.

TABLE 4

| | | Resin composition (wt. parts) | | | | Dielectric constant | | | Linear expansion coefficient (/°C.) |
|---|---|---|---|---|---|---|---|---|---|
| | | Resin (100) | | | Glass fiber | 60 Hz | 3 KHz | 1 MHz | |
| | Example | Diamine | Acid anhydride | | | | | | |
| Example 21 | 3 | m,m-APP-CF$_3$-I[1] | 6FDA[2] | | 30 | 3.82 | 3.80 | 3.79 | 2.1 × 10$^{-5}$ |
| | | | | | 60 | 4.15 | 4.12 | 4.09 | 1.8 |
| ↑ 22 | 4 | ↑ | BPDA[3] | | 30 | 3.99 | 3.97 | 3.49 | 1.7 |
| | | | | | 60 | 4.34 | 4.31 | 4.29 | 1.4 |
| ↑ 23 | 5 | m,m-APP-CF$_3$-II[4] | 6FDA | | 30 | 3.74 | 3.70 | 3.66 | 2.4 |
| | | | | | 60 | 4.05 | 4.02 | 3.99 | 2.0 |
| ↑ 24 | 6 | ↑ | BPDA | | 30 | 4.03 | 4.00 | 3.97 | 1.9 |
| | | | | | 60 | 4.33 | 4.30 | 4.26 | 1.5 |

TABLE 4-continued

| | Example | Resin composition (wt. parts) Resin (100) Diamine | Acid anhydride | Glass fiber | Dielectric constant 60 Hz | 3 KHz | 1 MHz | Linear expansion coefficient (/°C.) |
|---|---|---|---|---|---|---|---|---|
| ↑ 25 | 12 | m,m-APP-CF$_3$-I + m,m-APB[5] | 6FDA | 30 60 | 3.91 4.20 | 3.89 4.18 | 3.86 4.15 | 2.3 2.0 |
| ↑ 26 | 13 | m,m-APP-CF$_3$-I | 6FDA + BPDA | 30 60 | 3.87 4.18 | 3.85 4.15 | 3.82 4.15 | 2.1 2.0 |
| ↑ 27 | 15 | m,m-APP-CF$_3$-I + m,m-APB | ↑ | 30 60 | 4.02 4.37 | 4.00 4.35 | 3.96 4.32 | 2.2 2.0 |
| ↑ 28 | 17 | m,m-APP-CF$_3$-II + m,m-APB | 6FDA | 30 60 | 3.85 4.00 | 3.82 3.96 | 3.79 3.93 | 2.2 2.0 |
| Example 29 | 18 | m,m-APP-CF$_3$-II | 6FDA + BPDA | 30 60 | 3.95 4.13 | 3.93 4.10 | 3.90 4.07 | $2.4 \times 10^{-5}$ 2.2 |
| ↑ 30 | 20 | m,m-APP-CF$_3$-II + m,m-APB | ↑ | 30 60 | 4.00 4.30 | 3.96 4.27 | 3.94 4.25 | 2.2 1.9 |
| Com. Example 4 | 3 | m,m-APP-CF$_3$-I | 6FDA | 3 120 | 3.30 (film-formation impossible) | 3.28 | 3.26 | 4.5 |
| ↑ 5 | 4 | ↑ | BPDA | 3 120 | 3.55 (film-formation impossible) | 3.53 | 3.50 | 4.3 |
| ↑ 6 | 5 | m,m-APP-CF$_3$-II | 6FDA | 3 120 | 3.24 (film-formation impossible) | 3.21 | 3.19 | 4.6 |
| ↑ 7 | 6 | ↑ | BPDA | 3 120 | 3.26 (film-formation impossible) | 3.60 | 3.58 | 4.8 |
| ↑ 8 | Com. Example 1 | m,m-APB[6] | 6FDA | 30 60 | 4.09 4.53 | 4.06 4.50 | 4.04 4.47 | 2.8 2.4 |
| ↑ 9 | ↑ 2 | ↑ | BPDA | 30 60 | 4.55 4.84 | 4.51 4.80 | 4.49 4.77 | 3.0 2.8 |

[1] 2,6-Bis(3-aminophenoxy)-4-trifluoromethylpyridine
[2] 2,2-Bis(3,4-dicarboxyphenyl)-1,1,1,3,3,3-hexafluoromethylpropane dianhydride
[3] 3,3',4,4'-Biphenyltetracarboxylic dianhydride
[4] 2,6-Bis(3-aminophenoxy)-3-trifluoromethylpyridine
[5] 1,3-Bis(3-aminophenoxy)benzene
[6] 2,6-Bis(3-aminophenoxy)pyridine Examples 31–40

Various polyamic acid varnishes obtained in the above examples were mixed with a silane treated aromatic polyamide fiber Kevlor (Trade Mark of E. I. Du Pont de nemours & Co.) having a fiber length of 3 mm and fiber size of 13 μm. The aromatic polyamide fiber was used in an amount as illustrated in Table 5 for 100 parts by weight of the varnish as converted to the weight of polyimide. The mixture was thoroughly stirred and homogenized. Polyimide films were prepared from the mixture by the same procedures as carried out in Example 3. Table 5 illustrates the dielectric constant and coefficient of linear expansion in accordance with ASTM-696-76.

Comparative Examples 10–13

The same procedures as described in Examples 31–40 were carried out except that the aromatic polyamide fiber was used in an amount outside the scope of the invention. Properties of the resultant films were measured and results are illustrated in Table 5 together with results of Examples 31–40.

Comparative Examples 14–15

The aromatic polyamide fiber was added to the polyamic acid varnishes obtained in Comparative Examples 1 and 2 by the same procedures as carried out in Examples 31–40. Properties of resultant films were measured and results are illustrated in Table 5 together with results of Examples 31s–40.

TABLE 5

| | Example | Resin composition (wt. parts) Resin (100) Diamine | Acid anhydride | Aromatic polyamide fiber | Dielectric constant 60 Hz | 3 KHz | 1 MHz | Linear expansion coefficient (/°C.) |
|---|---|---|---|---|---|---|---|---|
| Example 31 | 3 | m,m-APP-CF$_3$-I[1] | 6FDA[2] | 30 60 | 3.67 4.03 | 3.65 4.00 | 3.62 3.97 | $1.9 \times 10^{-5}$ 1.6 |

TABLE 5-continued

| Example | Resin (100) Diamine | Acid anhydride | Aromatic polyamide fiber | Dielectric constant 60 Hz | 3 KHz | 1 MHz | Linear expansion coefficient (/°C.) |
|---|---|---|---|---|---|---|---|
| ↑ 32 | 4 | ↑ | BPDA[3] 30 | 3.84 | 3.81 | 3.79 | 1.9 |
|  |  |  | 60 | 4.34 | 4.31 | 4.29 | 1.5 |
| ↑ 33 | 5 | m,m-APP-CF₃-II[4] | 6FDA 30 | 3.62 | 3.60 | 3.56 | 2.0 |
|  |  |  | 60 | 4.05 | 4.02 | 3.99 | 1.8 |
| ↑ 34 | 6 | ↑ | BPDA 30 | 3.92 | 3.90 | 3.87 | 1.9 |
|  |  |  | 60 | 4.26 | 4.23 | 4.20 | 1.6 |
| ↑ 35 | 12 | m,m-APP-CF₃-I + m,m-APB[5] | 6FDA 30 | 3.84 | 3.81 | 3.77 | 2.0 |
|  |  |  | 60 | 4.11 | 4.08 | 4.06 | 1.6 |
| ↑ 36 | 13 | m,m-APP-CF₃-I | 6FDA + BPDA 30 | 3.81 | 3.78 | 3.75 | 2.0 |
|  |  |  | 60 | 4.10 | 4.07 | 4.05 | 1.7 |
| ↑ 37 | 15 | m,m-APP-CF₃-I + m,m-APB | ↑ 30 | 3.96 | 3.92 | 3.90 | 1.8 |
|  |  |  | 60 | 4.26 | 4.22 | 4.19 | 1.5 |
| ↑ 38 | 17 | m,m-APP-CF₃-II + m,m-APB | 6FDA 30 | 3.73 | 3.70 | 3.68 | 2.0 |
|  |  |  | 60 | 3.95 | 3.92 | 3.88 | 1.7 |
| Example 39 | 18 | m,m-APP-CF₃-II | 6FDA + BPDA 30 | 3.83 | 3.82 | 3.79 | $1.8 \times 10^{-5}$ |
|  |  |  | 60 | 4.02 | 4.00 | 3.96 | 1.5 |
| ↑ 40 | 20 | m,m-APP-CF₃-II + m,m-APB | ↑ 30 | 3.93 | 3.90 | 3.86 | 1.7 |
|  |  |  | 60 | 4.21 | 4.18 | 4.15 | 1.5 |
| Com. Example 10 | 3 | m,m-APP-CF₃-I | 6FDA 3 | 3.22 | 3.20 | 3.18 | 4.4 |
|  |  |  | 120 | (film-formation impossible) | | | |
| ↑ 11 | 4 | ↑ | BPDA 3 | 3.41 | 3.37 | 3.33 | 4.3 |
|  |  |  | 120 | (film-formation impossible) | | | |
| ↑ 12 | 5 | m,m-APP-CF₃-II | 6FDA 3 | 3.20 | 3.19 | 3.15 | 4.7 |
|  |  |  | 120 | (film-formation impossible) | | | |
| ↑ 13 | 6 | ↑ | BPDA 3 | 3.61 | 3.56 | 3.52 | 4.7 |
|  |  |  | 120 | (film-formation impossible) | | | |
| ↑ 14 | Com. Example 1 | m,m-APP[6] | 6FDA 30 | 4.00 | 3.96 | 3.92 | 2.6 |
|  |  |  | 60 | 4.44 | 4.41 | 4.38 | 2.2 |
| ↑ 15 | ↑ 2 | ↑ | BPDA 30 | 4.46 | 4.43 | 4.41 | 2.6 |
|  |  |  | 60 | 4.69 | 4.64 | 4.62 | 2.5 |

[1] 2,6-Bis(3-aminophenoxy)-4-trifluoromethylpyridine
[2] 2,2-Bis(3,4-dicarboxyphenyl)-1,1,1,3,3,3-hexafluoropropane dianhydride
[3] 3,3',4,4'-Biphenyltetracarboxylic dianhydride
[4] 2,6-Bis(3-aminophenoxy)-3-trifluoromethylpyridine
[5] 1,3-Bis(3-aminophenoxy)benzene
[6] 2,6-Bis(3-aminophenoxy)pyridine

What is claimed is:

1. A polyimide comprising a requisite structural unit consisting of one or more recurring structural units; represented by the formula (1):

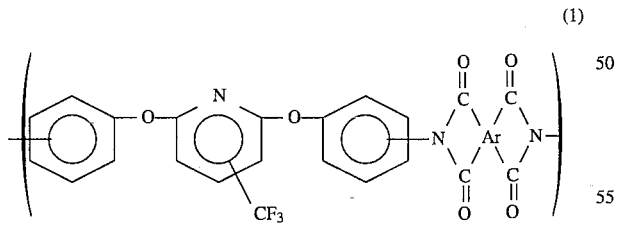

(1)

wherein Ar is a tetravalent radical having 6 to 27 carbon atoms and being selected from the group consisting of a monoaromatic radical, condensed polyaromatic radical and noncondensed polyaromatic radical having aromatic radicals connected to each other with a direct bond or a bridge member, a trifluoromethyl radical is situated at the 3- or the 4-position on a pyridine nucleus, and an imide nitrogen atom is connected at the 3- or the 4-position to an ether bond.

2. A polyimide comprising a requisite structural unit consisting of one or more recurring structural units represented by the formula (1):

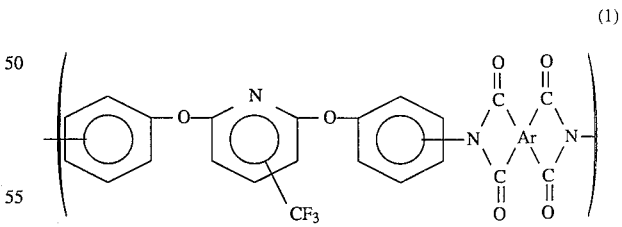

(1)

wherein Ar and positions of the trifluoromethyl radical and the imide nitrogen atom are the same as above, and having at the polymer chain end thereof an aromatic ring which is essentially unsubstituted or substituted with a radical having no reactivity with amine or dicarboxylic anhydride.

3. The polyimide of claim 2 comprising a requisite structural unit of one or more recurring structural units represented by the formula (1-1):

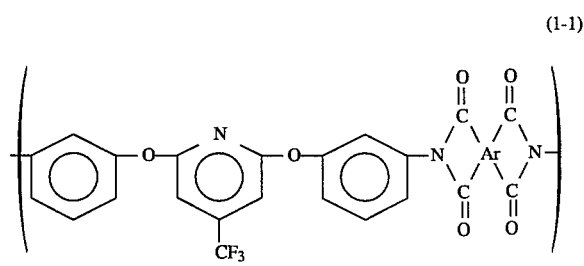

(1-1)

wherein Ar is the same as in the formula (1).

4. The polyimide of claim 2 comprising a requisite structural unit of one or more recurring structural units represented by the formula (1-2):

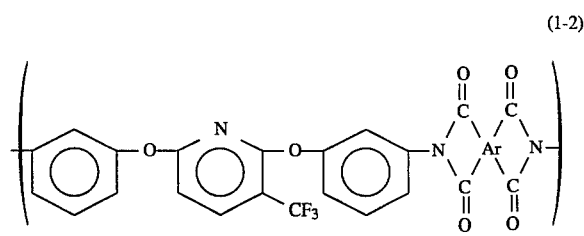

(1-2)

wherein Ar are the same as above.

5. A polyimide or a polyimide copolymer comprising a requisite structural unit of 1~100 mol % of recurring structural units represented by the formula (1):

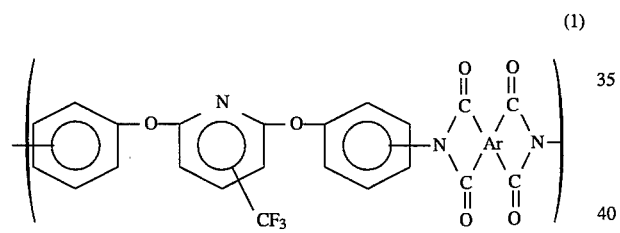

(1)

wherein Ar is a tetravalent radical having 6 to 27 carbon atoms and being selected from the group consisting of a monoaromatic radical, condensed polyaromatic radical and noncondensed polyaromatic radical having aromatic radicals connected to each other with a direct bond or a bridge member, a trifluoromethyl radical is situated at the 3- or the 4-position on the pyridine nucleus, and an imide nitrogen atom is connected at the 3- or the 4-position to an ether bond, and 99~0 mol % of recurring structural units represented by the formula (2):

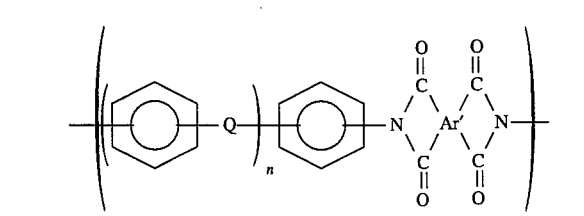

(2)

wherein n is an integer of 0 to 6; Q is a direct bond, —O—, —S—, —CO—, —SO$_2$—, —CH$_2$—, —C(CH$_3$)$_2$— or —C(CH$_3$)$_2$—, and when two or more bonding radicals Q connect aromatic rings to each other, the bonding radicals Q can be the same or different; and Ar' is a tetravalent having 6 to 27 carbon atoms and being selected from the group consisting of a monoaromatic radical, condensed polyaromatic radical and noncondensed polyaromatic radical having aromatic radicals connected to each other with a direct bond or a bridge member; or said polyimide or said polyimide copolymer having at the polymer chain end a radical which is essentially unsubstituted or substituted with a radical having no reactivity with amine or dicarboxylic anhydride.

6. A preparation process of polyimide having a requisite structural unit consisting of one or more recurring structural units represented by the formula (1):

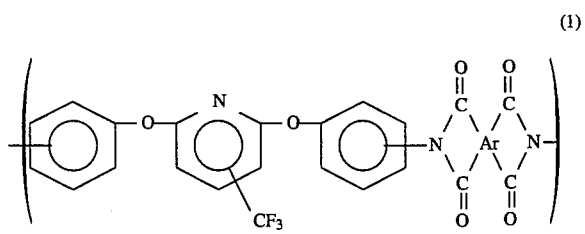

(1)

wherein Ar is a tetravalent radical having 6 to 27 carbon atoms and being selected from the group consisting of a monoaromatic radical, condensed polyaromatic radical and noncondensed polyaromatic radical having aromatic radicals connected to each other with a direct bond or a bridge member, a trifluoromethyl radical is situated at the 3- or the 4-position on the pyridine nucleus, and an imide nitrogen atom is connected at the 3- or the 4-position to an ether bond, comprising reacting aromatic diamine consisting essentially of one or more aromatic diamino compounds represented by the formula (3):

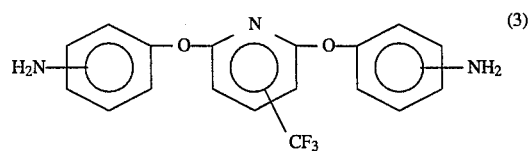

(3)

wherein a trifluoromethyl radical is situated at the 3- or the 4-position on a pyridine nucleus, and an amino radical is connected at the 3- or the 4-position to an ether bond, with tetracarboxylic dianhydride essentially represented by the formula (4):

(4)

wherein Ar is a tetravalent radical having 6 to 27 carbon atoms and being selected from the group consisting of a monoaromatic radical, condensed polyaromatic radical and noncondensed polyaromatic radical having aromatic radicals connected to each other with a direct bond or a bridge member; and thermally or chemically imidizing the resultant polyamic acid.

7. A preparation process of a polyimide having a requisite structural unit consisting of one or more recurring structural units represented by the formula (1):

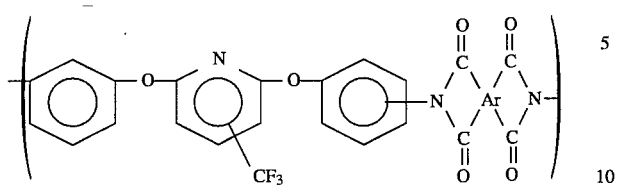

wherein Ar is a tetravalent radical having 6 to 27 carbon atoms and being selected from the group consisting of a monoaromatic radical, condensed polyaromatic radical and noncondensed polyaromatic radical having aromatic radicals connected to each other with a direct bond or a bridge member, a trifluoromethyl radical is situated at the 3- or the 4-position on the pyridine nucleus, and an imide nitrogen atom is connected at the 3- or the 4-position to an ether bond, and having at the polymer chain end thereof an aromatic ring which is essentially unsubstituted or substituted with a radical having no reactivity with amine or dicarboxylic anhydride, comprising reacting aromatic diamine consisting essentially of one or more aromatic diamino compounds represented by the formula (3):

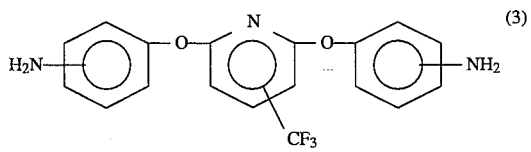

wherein positions of the trifluoromethyl radical and the amino radical is connected at the 3- or the 4-position to an ether bond, with tetracarboxylic dianhydride essentially represented by the formula (4):

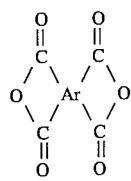

wherein Ar is the same as above, in the presence of aromatic dicarboxylic anhydride represented by the formula (5):

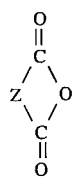

wherein Z is a divalent radical having 6 to 15 carbon atoms and being selected from the group consisting of a monoaromatic radical, condensed polyaromatic radical and noncondensed polyaromatic radical having aromatic radicals connected to each other with a direct bond or a bridge member, or aromatic monoamine represented by the formula (6):

wherein $Z_1$ is a monovalent radical having 6 to 15 carbon atoms and being selected from the group consisting of a monoaromatic radical, condensed polyaromatic radical and noncondensed polyaromatic radical having aromatic radicals connected to each other with a direct bond or a bridge member; and thermally or chemically imidizing the resultant polyamic acid.

8. A preparation process of polyimide or a polyimide copolymer of claim 5, comprising reacting 1~0.01 parts by mole of aromatic diamine represented by the formula (3):

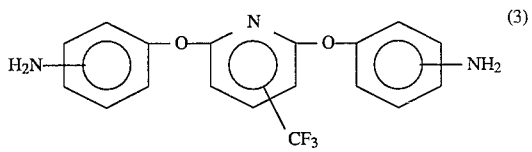

wherein positions of the trifluoromethyl radical and the amino radical are the same as above, with 1~0.01 parts by mole of tetracarboxylic dianhydride essentially represented by the formula (4):

wherein Ar is the same as above, and further reacting 0~0.99 parts by mole of one or more aromatic diamine represented by the formula (9):

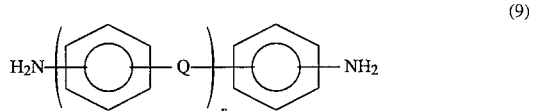

wherein n is an integer of 0~6, and Q is a direct bond, —O—, —S—, —CO—, —SO$_2$—, —CH$_2$—, —C(CH$_3$)$_2$— or —C(CF$_3$)$_2$—, and when two or more bonding radicals Q connect aromatic rings to each other, the bonding radicals Q can be the same or different, with 0~0.99 parts by mole of tetracarboxylic dianhydride represented by the formula (10):

wherein Ar' is a tetravalent radical having 6 to 27 carbon atoms and being selected from the group consisting of a monoaromatic radical, condensed polyaromatic radical and noncondensed polyaromatic radical having aromatic radicals connected to each other with a direct bond or a bridge member.

9. A preparation process of polyimide or a polyimide copolymer of claim 8, comprising carrying out the reaction in the presence of 0.001~1.0 mol of aromatic dicarboxylic anhydride represented by the formula (5):

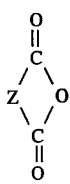
(5)

wherein Z is a divalent radical having 6 to 15 carbon atoms and being selected from the group consisting of a monoaromatic radical, condensed polyaromatic radical and noncondensed polyaromatic radical having aromatic radicals connected to each other with a direct bond or a bridge member, for 1 mol of total aromatic diamine, or in the presence of 0.001~1.0 mol of aromatic monoamine represented by the formula (6):

$$Z_1-NH_2 \quad (6)$$

wherein $Z_1$ is a monovalent radical having 6 to 15 carbon atoms and being selected from the group consisting of a monoaromatic radical, condensed polyaromatic radical and noncondensed polyaromatic radical having aromatic radicals connected to each other with a direct bond or a bridge member; for 1 mol of total tetracarboxylic dianhydride; and thermally or chemically imidizing the resultant polyamic acid.

10. An aromatic diamino compound represented by the formula (3):

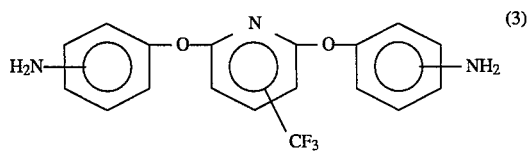
(3)

wherein the trifluoromethyl radical is situated at the 3- or the 4-position on a pyridine nucleus and the amino radical is connected at the 3- or the 4-position to an ether bond.

11. The aromatic diamino compound of claim 10 represented by the formula (3-1):

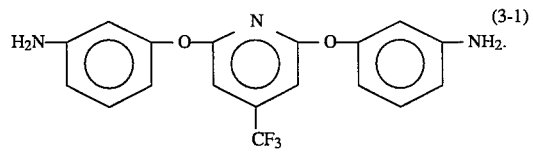
(3-1)

12. The aromatic diamino compound of claim 10 represented by the formula (3-2):

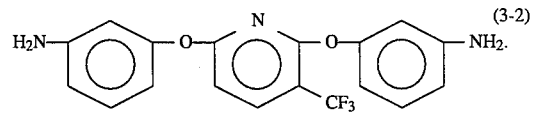
(3-2)

13. A preparation process of the aromatic diamino compound represented by the formula (3):

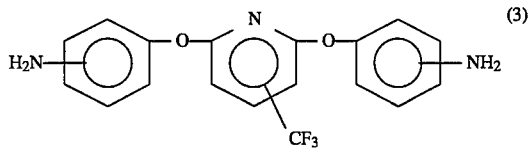
(3)

wherein the trifluoromethyl radical is situated at the 3- or the 4-position on a pyridine nucleus, and the amino radical is connected at the 3- or the 4-position to an ether bond, comprising carrying out condensation of 2,6-dichloro-3- or 4-trifluoropyridine with 3- or 4-aminophenol in an aprotic polar solvent in the presence of a base.

14. A polyimide based resin composition comprising 100 parts by weight of polyimide or a polyimide copolymer of claim 5 and 5 to 70 parts by weight of a fibrous reinforcement selected from carbon fiber, glass fiber, aromatic polyamide fiber and potassium titanate fiber.

15. An injection molded article obtained from the polyimide based resin composition of claim 14.

16. A polyimide film comprising polyimide or the polyimide copolymer of the claim 5.

17. The polyimide of claim 1 comprising a requisite structural unit of one or more recurring structural units represented by the formula (1-1):

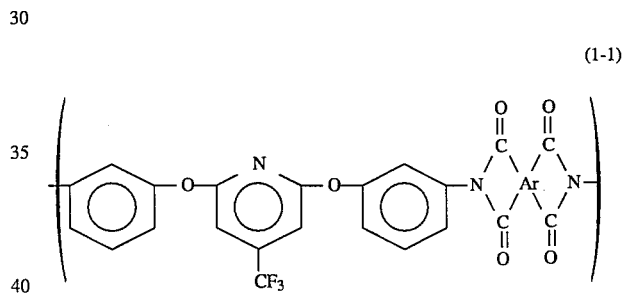
(1-1)

wherein Ar is the same as in the formula (1).

18. The polyimide of claim 1 comprising a requisite structural unit of one or more recurring structural units represented by the formula (1~2):

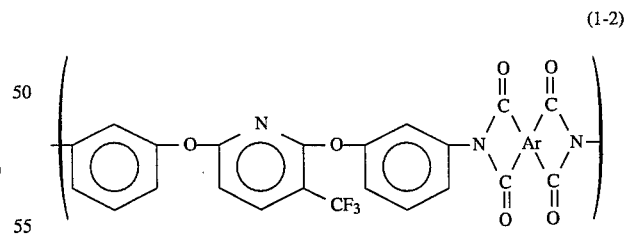
(1-2)

wherein L and Ar are the same as above.

* * * * *

UNITED STATES PATENT AND TRADEMARK OFFICE
CERTIFICATE OF CORRECTION

PATENT NO. : 5,470,943

DATED : November 28, 1995

INVENTOR(S) : Yoshihiro SAKATA et al

It is certified that error appears in the above-indentified patent and that said Letters Patent is hereby corrected as shown below:

Under Section [56] References Cited, please include the heading --OTHER PUBLICATIONS-- and listed below this heading, the following should appear:
--A.K. St. Clair et al, Polymeric Materials Science and Engineering, "Low Dielectric Polyimides for Electronic Applications", 59, pp. 28-82, 1988.--

In the Claims:

Column 32
In claim 2, line 44, delete "A polyimide" and insert therefor --The polyimide of claim 1--.

Column 33
In claim 5, line 64, delete "-C(CH$_3$)$_2$-" and insert therefor -- -C(CF$_3$)$_2$- --.

Column 38
In claim 18, line 56, delete "L and Ar are" and insert therefor --Ar is--.

Signed and Sealed this

Eighteenth Day of February, 1997

Attest:

BRUCE LEHMAN

Attesting Officer

Commissioner of Patents and Trademarks